US012675435B2

(12) United States Patent (10) Patent No.: US 12,675,435 B2
Huo et al. (45) Date of Patent: Jul. 7, 2026

(54) INTENT BASED CONTAINER IMAGE BUILDING

(71) Applicant: International Business Machines Corporation, Armonk, NY (US)

(72) Inventors: Zhan Peng Huo, Beijing (CN); Yu Zui You, Ningbo (CN); Wen Ji Huang, Beijing (CN); Xiao Ling Chen, Changping District (CN); Heng Wang, Changping District (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/784,449

(22) Filed: Jul. 25, 2024

(65) Prior Publication Data

US 2026/0030202 A1 Jan. 29, 2026

(51) Int. Cl.
G06F 16/11 (2019.01)
G06F 16/16 (2019.01)

(52) U.S. Cl.
CPC .......... G06F 16/128 (2019.01); G06F 16/168 (2019.01)

(58) Field of Classification Search
CPC .............................. G06F 16/128; G06F 16/168
(Continued)

(56) References Cited

U.S. PATENT DOCUMENTS 8,219,592 B2 7/2012 Alpern et al.
8,532,397 B1 * 9/2013 Thakkar ................ G06F 16/285
382/173
(Continued)

FOREIGN PATENT DOCUMENTS

CN 111198938 A * 5/2020 ......... G06F 16/3344
CN 114626084 A * 6/2022 ......... G06F 9/45558
(Continued)

OTHER PUBLICATIONS

Zhang et al., "Recommending Base Image for Docker Containers based on Deep Configuration Comprehension", 2022 IEEE International Conference on Software Analysis, Evolution and Reengineering (SANER), Mar. 15-18, 2022, pp. 449-453. (Year: 2022).*
(Continued)

*Primary Examiner* — Phuong Thao Cao
(74) *Attorney, Agent, or Firm* — Aaron Pontikos, Esq.; Heslin Rothenberg Farley & Mesiti P.C.; George S. Blasiak, Esq.

(57) ABSTRACT

Methods, computer program products, and systems are presented. The method computer program products, and systems can include, for instance: performing natural language processing to process a text string of a user, wherein the text string specifies characteristics of a container image to be built; processing, with use of natural language processing, instances of text-based data that describe respective ones of a plurality of container images stored within a container image repository; selecting, in dependence on a result of the performing natural language processing, and the processing, a base image from the plurality of container images; and presenting prompting data to the user that prompts building of a new container image, wherein the prompting data references the base image.

20 Claims, 10 Drawing Sheets

(58) Field of Classification Search
USPC ......................................................... 707/609
See application file for complete search history.

(56) References Cited

U.S. PATENT DOCUMENTS

| | | | | |
|---|---|---|---|---|
| 9,035,949 | B1 * | 5/2015 | Oberheu | G06T 11/206 |
| | | | | 345/440 |
| 10,002,247 | B2 | 6/2018 | Suarez et al. | |
| 10,685,033 | B1 * | 6/2020 | Searls | G06F 16/54 |
| 10,839,254 | B2 | 11/2020 | Waugh et al. | |
| 11,573,814 | B1 * | 2/2023 | Aithal | G06F 16/188 |
| 11,803,303 | B1 * | 10/2023 | Huo | G06F 11/004 |
| 11,836,484 | B1 * | 12/2023 | Hensley | G06F 8/65 |
| 11,880,703 | B2 * | 1/2024 | Scrivano | G06F 8/63 |
| 12,033,258 | B1 * | 7/2024 | Sohail | G10L 21/10 |
| 12,261,827 | B1 * | 3/2025 | Xu | H04L 41/16 |
| 12,287,825 | B1 * | 4/2025 | Wu | G06F 16/535 |
| 12,346,703 | B1 * | 7/2025 | Desrosiers | G06F 16/116 |
| 2009/0282404 | A1 | 11/2009 | Khandekar et al. | |
| 2016/0078368 | A1 | 3/2016 | Kakhandiki et al. | |
| 2016/0142261 | A1 | 5/2016 | Huang et al. | |
| 2017/0255462 | A1 * | 9/2017 | Azagury | G06F 9/30145 |
| 2018/0285210 | A1 * | 10/2018 | Mitkar | G06F 11/324 |
| 2019/0354389 | A1 * | 11/2019 | Du | G06F 9/45545 |
| 2019/0379579 | A1 * | 12/2019 | Mishra | H04L 67/51 |
| 2019/0392045 | A1 * | 12/2019 | De Lima Junior | G06F 12/0875 |
| 2019/0392155 | A1 * | 12/2019 | Eldefrawy | G06F 21/602 |
| 2020/0065409 | A1 * | 2/2020 | Batts | G06F 16/2282 |
| 2020/0272427 | A1 * | 8/2020 | Wang | G06F 8/63 |
| 2021/0103450 | A1 * | 4/2021 | Prasad | G06F 9/45558 |
| 2021/0149648 | A1 * | 5/2021 | Velammal | G06N 20/00 |
| 2021/0149685 | A1 * | 5/2021 | Reinders | G06F 9/45558 |
| 2021/0349801 | A1 * | 11/2021 | Rafey | G06F 11/3495 |
| 2021/0382997 | A1 * | 12/2021 | Yi | G06F 21/577 |
| 2022/0328143 | A1 * | 10/2022 | Kolmes | G06N 3/08 |
| 2022/0350797 | A1 * | 11/2022 | Arseneault | G06F 16/2455 |
| 2022/0374218 | A1 * | 11/2022 | Monteiro Vieira | G06F 8/63 |
| 2023/0036739 | A1 * | 2/2023 | Deppisch | G06F 9/45558 |
| 2023/0065504 | A1 * | 3/2023 | Wagner | G01N 15/1433 |
| 2023/0118939 | A1 * | 4/2023 | Malvankar | G06F 9/45558 |
| | | | | 718/1 |
| 2023/0266955 | A1 * | 8/2023 | Li | G06F 9/45558 |
| | | | | 717/174 |
| 2023/0325080 | A1 * | 10/2023 | Huo | G06F 11/1441 |
| 2023/0325500 | A1 * | 10/2023 | Patrich | G06F 21/554 |
| | | | | 726/22 |
| 2024/0004631 | A1 * | 1/2024 | Nelson | G06F 9/455 |
| 2024/0086168 | A1 | 3/2024 | Douglas et al. | |
| 2024/0168744 | A1 * | 5/2024 | Mohan | G06F 8/71 |
| 2024/0201979 | A1 * | 6/2024 | Guan | G06F 8/656 |
| 2024/0411873 | A1 * | 12/2024 | Lande Blau | G06F 21/554 |
| 2024/0427595 | A1 * | 12/2024 | Zheng | G06F 8/77 |
| 2025/0265289 | A1 * | 8/2025 | Lamere | G06F 16/68 |

FOREIGN PATENT DOCUMENTS

| | | | | | |
|---|---|---|---|---|---|
| CN | 116188632 | A | * | 5/2023 | G06T 11/60 |
| KR | 102470668 | B1 | * | 11/2022 | H05B 47/10 |
| WO | WO-2020036482 | A1 | * | 2/2020 | G06F 9/4451 |
| WO | WO-2023216987 | A1 | * | 11/2023 | G06F 9/45558 |

OTHER PUBLICATIONS

Rosa et al. "Automatically Generating Dockerfiles via Deep Learning: Challenges and Promises," arXiv:2303. 15990v1. retrieved from https://arxiv.org/abs/2303.15990, Published Mar. 28, 2023.
Flux "Automate image updates to Git," retrieved from https://fluxcd. io/flux/guides/image-update/.
Github "AutoGPT: Build & Use AI Agents," retrieved from github. com/Significant-Gravitas/AutoGPT.
Kamat, Ashish "AIaC: Artificial Intelligence Infrastructure-as-Code Generator," Medium, Jan. 20, 2023.

* cited by examiner

Help me find a <u>NGINX image</u> with <u>HTTPS enabled</u> and <u>security configuration</u> enabled. This image will be used as a <u>gateway and will</u> <u>serve approximately</u> <u>1w users</u>

INTENT BASED CONTAINER IMAGE BUILDING

BACKGROUND

Embodiments herein relate to container-based virtualization and in particular to intent based container image building.

One method for virtualization is container-based virtualization in which container virtual machines are deployed.

Container-based virtualization, also called operating system virtualization, is an approach to virtualization in which the virtualization layer runs as an application within an operating system. In this approach, the operating system's kernel can run on a physical computing node with several isolated application environments installed on top of it. The isolated guest application environments are called containers.

Isolation between the containers occurs at multiple resources, such as at the filesystem, the network stack subsystem, and one or more namespaces, but not limited thereto. By sharing the same running kernel and memory space there is virtually no difference between the performance of the "host" operating system and the containers.

A container image is generally understood to be an unchangeable, static file that includes executable code so it can run an isolated process on information technology (IT) infrastructure. The image, arguably the foundation of container technology, can be understood as a special file system. Images can be utilized to provide not various files, including but not limited to, programs, libraries, resources, and configuration files, which are executed by the container. Images can also include configuration parameters (e.g., anonymous volumes, environment variables, users, etc.), which the containers access during runtime.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: performing natural language processing to process a text string of a user, wherein the text string specifies characteristics of a container image to be built; processing, with use of natural language processing, instances of text-based data that describe respective ones of a plurality of container images stored within a container image repository; selecting, in dependence on a result of the performing natural language processing, and the processing, a base image from the plurality of container images; and presenting prompting data to the user that prompts building of a new container image, wherein the prompting data references the base image.

In another aspect, a computer program product can be provided. The computer program product can include a computer readable storage medium readable by one or more processing circuit and storing instructions for execution by one or more processor for performing a method. The method can include, for example: performing natural language processing to process a text string of a user, wherein the text string specifies characteristics of a container image to be built; processing, with use of natural language processing, instances of text-based data that describe respective ones of a plurality of container images stored within a container image repository; selecting, in dependence on a result of the performing natural language processing, and the processing, a base image from the plurality of container images; and presenting prompting data to the user that prompts building of a new container image, wherein the prompting data references the base image.

In a further aspect, a system can be provided. The system can include, for example, a memory. In addition, the system can include one or more processor in communication with the memory. Further, the system can include program instructions executable by the one or more processor via the memory to perform a method. The method can include, for example: performing natural language processing to process a text string of a user, wherein the text string specifies characteristics of a container image to be built; processing, with use of natural language processing, instances of text-based data that describe respective ones of a plurality of container images stored within a container image repository; selecting, in dependence on a result of the performing natural language processing, and the processing, a base image from the plurality of container images; and presenting prompting data to the user that prompts building of a new container image, wherein the prompting data references the base image.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
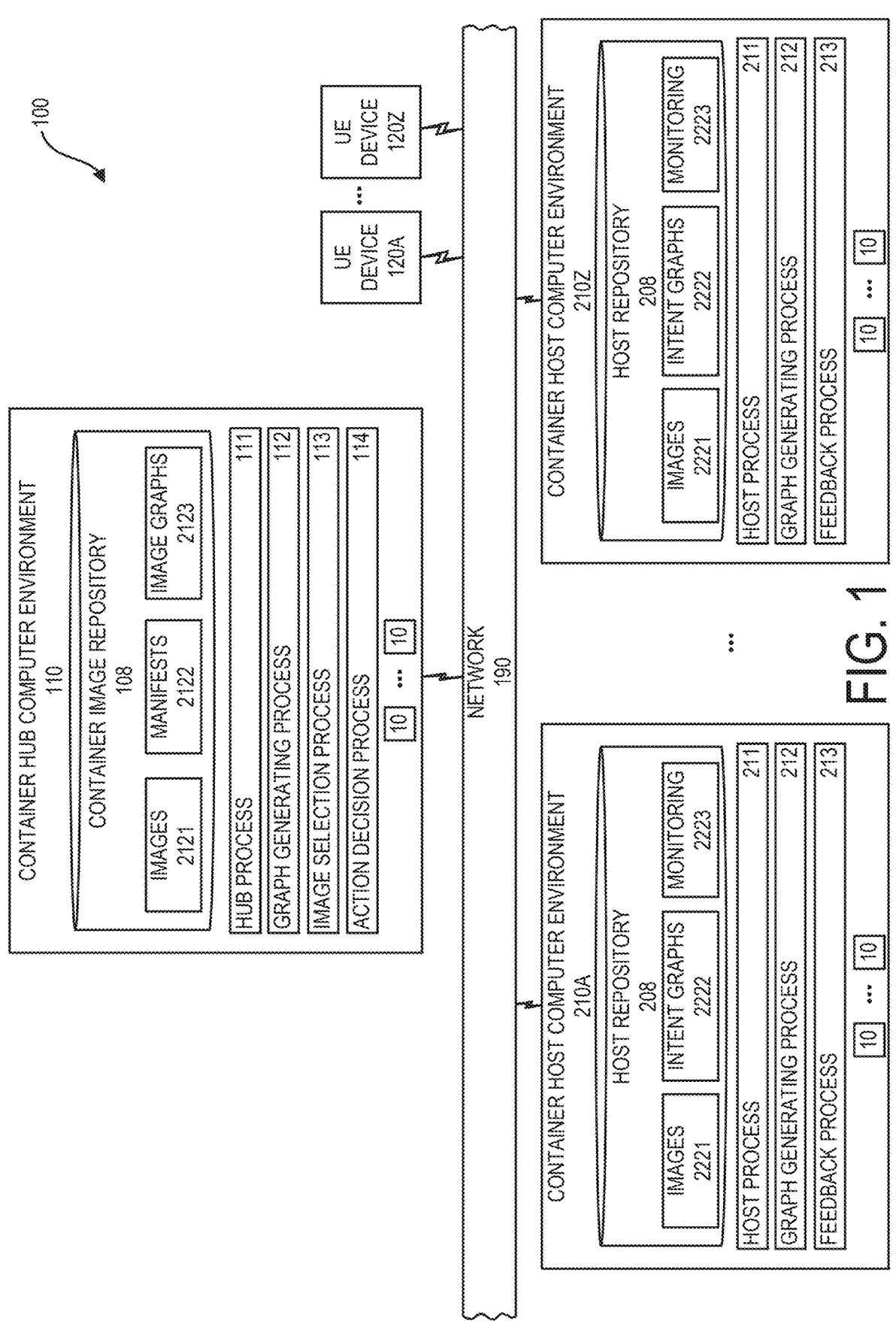
FIG. 1 is a system having a container hub computer environment, container host computer environments, and user equipment (UE) devices according to one embodiment.

In one aspect, embodiments herein can optionally include performing natural language processing to process a text string of a user, wherein the text string specifies characteristics of a container image to be built; processing, with use of natural language processing, instances of text-based data that describe respective ones of a plurality of container images stored within a container image repository; selecting, in dependence on a result of the performing natural language processing, and the processing, a base image from the plurality of container images; and presenting prompting data to the user that prompts building of a new container image, wherein the prompting data references the base image. According to an example of a technical effect of the combination, a container image can be built in accordance with the intent of a user.

According to one optional feature, the text string is received through a user interface text entry area presented to the user, wherein the user interface facilitates entry of free-form text by the user. According to an example of a technical effect of the combination, a container image can be built in accordance with an intent of a user as expressed by text entered by the user into the user interface.

According to one optional feature, the performing natural language processing to process the text string of the user includes applying model prompting data to a predictive model using the text string. According to an example of a technical effect of the combination, user intent can be extracted with accuracy based on historical data.

According to one optional feature, the processing, with use of natural language processing, text-based data that describes a plurality of container images, includes querying a model with text-based data describing a first container image, obtaining from the querying predicted first image labels describing the first container image, performing querying of the model with text-based data describing a second container image, and obtaining from the performing querying predicted second image labels describing the second container image. According to an example of a technical effect of the combination, attributes of container images can be extracted with accuracy with use of historical data.

According to one optional feature, wherein the performing natural language processing to process the text string of the user includes applying model prompting data to a predictive model using the text string and obtaining from the applying model prompting data. According to an example of a technical effect of the combination, user intent can be extracted with accuracy based on historical data.

According to one optional feature, wherein the performing natural language processing to process the text string of the user includes applying model prompting data to a predictive model using the text string, and obtaining from the applying predicted intent labels, wherein the processing, with use of natural language processing, text-based data that describes a plurality of container images, includes querying a model with text-based data describing a first container image, obtaining from the querying predicted first image labels describing the first container image, performing querying of the model with text-based data describing a second container image, and obtaining from the performing querying predicted second image labels describing the second container image, and wherein the method includes comparing the intent labels to the first image labels and the second image labels. According to an example of a technical effect of the combination, an intent of user can be accurately compared to attributes of container images.

According to one optional feature, the performing natural language processing to process the text string of the user includes applying model prompting data to a predictive model using the text string, wherein the processing, with use of natural language processing, text-based data that describes a plurality of container images, includes querying a model with text-based data describing a first container image, performing querying of the model with text-based data describing a second container image, wherein the predictive model, and the model have been trained with supervised learning training data so that the predictive model and the model output predicted labels in common attribute categories. According to an example of a technical effect of the combination, an intent of user can be accurately compared to attributes of container images.

According to one optional feature, the method includes wherein the performing natural language processing to process the text string of the user includes applying model prompting data to a predictive model using the text string, and obtaining from the applying predicted intent labels having predicted intent attribute categories, wherein the processing, with use of natural language processing, text-based data that describes a plurality of container images, includes querying a model with text-based data describing a first container image, obtaining from the querying predicted first image labels having predicted image attribute categories describing the first container image, performing querying of the model with text-based data describing a second container image, and obtaining from the performing querying predicted second image labels having the predicted image attribute categories describing the second container image, and wherein the method includes comparing the intent labels to the first image labels and the second image labels, and wherein the method includes coordinating training of the predictive model and the model so that the image attribute categories map to the intent attribute categories. According to an example of a technical effect of the combination, an intent of user can be accurately compared to attributes of container images.

According to one optional feature, the method includes wherein the selecting includes determining a semantic similarity of the text string to respective ones of the instances of text-based data that describe respective ones of a plurality of container images. According to an example of a technical effect of the combination, a container image can be accurately built in dependence on user intent.

According to one optional feature, the method includes wherein respective ones of the instances of text-based data that describe respective ones of a plurality of container images include (a) manifest data defined by a container image manifest, and (b) container image history data returned from running a container image history command. According to an example of a technical effect of the combination, attributes of container images can be extracted for comparison to user intent.

According to one optional feature, the method includes wherein the selecting includes determining a semantic similarity of the text string to respective ones of the instances of text-based data that describe respective ones of a plurality of container images, and wherein the determining the semantic similarity includes (a) extracting an intent label by application of the text string to a predictive model, (b) extracting respective image labels by querying a model using the respective instances of the text-based data describing respective ones of the container images, (c) converting the intent label and the respective image labels to vector representations using Word2Vec processing, and (d) finding a Euclidian distance between the vector representation of the intent label and the respective ones of the image labels. According to an example of a technical effect of the combination, an intent of user can be accurately compared to attributes of container images.

According to one optional feature, the method includes generating, in dependence on the processing, container image relationship graphs for respective ones of the plurality of container images. According to an example of a technical effect of the combination, attributes of container images can be accurately extracted for comparison to user intent.

According to one optional feature, the method includes generating, in dependence on the processing, container image relationship graphs for respective ones of the plurality of container images, and wherein the selecting is performed in dependence on edge weights of the container image relationship graphs for respective ones of the plurality of the container-based images. According to an example of a technical effect of the combination, a container image can be accurately built in dependence on user intent.

According to one optional feature, the method includes generating, in dependence on the processing, container image relationship graphs for respective ones of the plurality of container images, and wherein the selecting is performed in dependence on edge weights of the container image relationship graphs for respective ones of the plurality of container images, wherein the method includes, subsequent to the selecting, (a) updating an edge weight of a container image relationship graph of the base image in dependence on user specified review data of a runtime instance of the base image, (b) receiving, subsequent to the updating, the text string, and (c) performing selection of an alternate base image different from the base image in dependence on the edge weight of the container image relationship graph of the base image having been updated by the updating. According to an example of a technical effect of the combination, building of container image misaligned to user intent can be avoided in dependence on feedback data defining history data.

According to one optional feature, the method includes generating, in dependence on the processing, container image relationship graphs for respective ones of the plurality of container images, and wherein the selecting is performed in dependence on edge weights of the container image relationship graphs for respective ones of the plurality of container images, wherein the method includes, subsequent to the selecting. (a) updating an edge weight of a container image relationship graph of the base image in dependence on observability data collected for a runtime instance of the base image. (b) receiving, subsequent to the updating, the text string, and (c) performing selection of an alternate base image different from the base image in dependence on the edge weight of the container image relationship graph of the base image having been updated by the updating. According to an example of a technical effect of the combination, building of container image misaligned to user intent can be avoided in dependence on feedback data defining history data.

According to one optional feature, the method includes building the new container image, and deploying the new container image by running the new container image. According to an example of a technical effect of the combination, a running container can be provided in dependence on user intent.

According to one optional feature, the method includes building the new container image in accordance with the prompting data and deploying the new container image by running the new container image. According to an example of a technical effect of the combination, a container image can be built in dependence on user intent.

According to one optional feature, the method includes building the new container image in accordance with user defined data input responsively to the prompting data and deploying the new container image by running the new container image. According to an example of a technical effect of the combination, a container image can be built and run in dependence on user intent.

System 100 for use in building container images based on user intent is shown in FIG. 1. System 100 can include container hub computer environment 110, container host computer environments 210A-210Z, and user equipment (UE) devices 120A-120Z. Container hub computer environment 110, container host computer environments 210A-210Z, and UE devices 120A-120 Z can be computing node-based systems in communication with one another via network 190. Network 190 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

Container hub computer environment 110 can include container image repository 108 that stores container images. Container hub computer environment 110 can be configured for use by container host computer environments 210A-210Z which container host computer environments 210A-210Z can be respectively associated to different enterprises. Container hub computer environment 110 in one aspect can make available various container images for use by respective ones of the container host computer environments 210A-210Z.

In building a container image at a respective ones of container host computer environments 210A-210Z, the respective container host computer environment can pull one or more container image from container hub computer environment 110. In further aspect container host computer environments 210A-210Z can push container images to container hub computer environment 110 for storage therein so that the pushed container images can be accessed for use by remaining ones of container host computer environments 210A-210Z.

UE devices 120A-120Z can be used by various users, i.e. administrator user of system 100. Administrator users of system 100 can include agent administrator users of respective vendor enterprises associated to the respective ones of container host computer environments 210A-210Z. Administrator users can also be, e.g., an administrator user associated to container hub computer environment 110.

Container hub computer environment 110 can include container image repository 108. Container image repository 108 can store in container images area 2121 container images. Each container image can include a lightweight, standalone, executable package that includes everything needed to run a piece of software, such as the code, runtime, libraries, environment variables, and configuration files. Container images are typically built in layers, with each layer representing a change or addition to the image. These layers can be stored in images area 2121 and can be shared across multiple images, optimizing storage and download efficiency.

Container image repository 108 in manifests area 2122 can store, e.g. a manifest associated to respective ones of container images stored in container images area 2121. A container image manifest can include information for assembling and running a container image, including the schema version, media type, and a list of image layers with their digests, media types, and sizes. A container image manifest can include the image configuration with its digest, media type, and size, and can specify the architecture and operating system for which the image is built. Optional sections include the image's history, additional annotations, and platform compatibility details. This comprehensive blueprint ensures the container runtime can correctly reconstruct and execute the container image.

Container image repository 108 in image graphs area 2123 can store relationship graphs representing respective ones of container images stored in images area 2121. An image graph of image graph area 2123 facilitates comparison of a container image stored in images area 2121 in respect to an intent associated to a user request for container image received by container hub computer environment 110.

Container hub computer environment 110 can run various processes. Container hub computer environment 110 running hub process 111 can include container hub computer environment 110 performing various functions that define container hub computer environment 110 as a container hub computer environment. Such functions can include, e.g., providing a centralized platform for storing, managing, and distributing container images. Functions defining container hub computer environment 110 as a container hub computer environment can also or alternatively include providing a repository where developers can store their container images. These images are typically built using a predetermined filed format and can include all the dependencies and configurations needed to run an application. Functions defining container hub computer environment 110 as a container hub computer environment can also or alternatively include providing public repositories, which are accessible to anyone, or private repositories, which are restricted to specific users or teams. This flexibility allows for both open-source sharing and secure, private storage. supports versioning of container images, allowing developers to tag images with specific versions. This makes it easy to track changes, roll back to previous versions, and maintain a history of image updates. Functions defining container hub computer environment 110 as a container hub computer environment can also or alternatively include automatically building container images from a source code repository like GITHUB®. GITHUB® is a registered trademark of GitHub, Inc. This feature integrates with version control systems to trigger builds whenever code changes are pushed to the repository. Container hub computer environment 110 can facilitate distribution of container images by providing a centralized location from which users can pull images. Such functionality enables sharing and collaboration within teams and across organizations. Users can search for and discover container images created by others. Functions defining container hub computer environment 110 as a container hub computer environment can also or alternatively include hosting a wide range of pre-built images for various applications and services, which can be used as starting points for new projects. Functions defining container hub computer environment 110 as a container hub computer environment can also or alternatively include providing security scanning features that analyze container images for known vulnerabilities. This helps ensure that the images being used in production are secure and up to date. Container hub computer environment 110 can be configured to send notifications or trigger webhooks based on events such as new image pushes. This integration can help automate workflows and keep teams informed about changes.

Container hub computer environment 110 running graph generating process 112 can include container hub computer environment 110 generating an image graph that represents a container image in a form that permits and facilitates comparison of a container image to a user intent expressed in a user request for a container image. In a further aspect, container hub computer environment 110 running graph generating process 112 can include container hub computer environment 110 updating an image graph for a container image based on monitoring data received during instances of the container image. Container hub computer environment 110 can be configured to iteratively update image graphs of image graphs area 2123 based on monitoring data received from monitoring areas 2223 of respective container host computer environments 210A-210Z. Container hub computer environment 110 running graph generating process 112 can include container hub computer environment 110 processing text by natural language processing (NLP). Text processed by NLP can include container image manifest text and container image history text. NLP can include the use of various technologies like machine learning, deep learning (including neural networks and transformers), and specialized libraries such as NLTK and SpaCy. NLP can employ models like BERT and GPT, tools like Gensim for topic modeling, and word embedding techniques like Word2Vec. Container hub computer environment 110 processing text by natural language processing (NLP) can include container hub computer environment querying one or more LLM that has been trained by fine tuning training, such as LLM 3102, as set forth herein.

Container hub computer environment 110 running image selection process 113 can include container hub computer environment 110 comparing container images stored in images area 2121 to a user intent associated to a current user request for a container image. Container hub computer environment 110 running image selection process 113 can include container hub computer environment 110 comparing an image graph stored in image graphs area 2123 to an intent graph representing a user intent associated to a current request for container image received from a user.

Container hub computer environment 110 running action decision process 114 can include container hub computer environment 110 returning an action decision in dependence on an image selection performed by container hub computer environment 110.

Container hub computer environment 110 can include various computing nodes 10. Computing nodes 10 can be physical computing nodes. Computing nodes 10 can e.g., host one or more database defining respectively images area of images area 2121, manifests area 2122, and image graphs area 2123 of container image repository 108. One or more computing node of computing nodes 10 can also e.g., host one or more program defining the functions performed by hub process 111, image graph generating process 112, image selection process 113, and action decision process 114. It will be understood that processes herein performed by container hub computer environment 110 can be performed by one or more computing node 10 running one or more program.

Respective ones of container host computer environments 210A-210Z can include host repository 208. Host repository 208 in intent graphs area 2222 can include intent graphs representing an intent a user in defining a request for container image to be built and run at container host computer environment 210A. Container host computer environments 210A-210Z in monitoring area 2223 can store monitoring data. In one aspect respective ones of container host computer environments 210A-210Z can be configured to perform monitoring of running containers that have been deployed by running built container images stored in images area 2221. Monitoring data of monitoring area 2223 can include, e.g., observability data defined, e.g., by logging data metrics data and/or trace data as well as user specified data that specifies attributes of performance of the containers running within respective ones of container host computer environments 210A-210Z.

Container host computer environments 210A-210Z can include various computing nodes 10. Computing nodes 10 can be physical computing nodes. Computing nodes 10 can e.g., host one or more database defining host repository 208. One or more computing node of computing nodes 10 can also e.g., host one or more program defining the functions performed by host process 211, intent graph generating process 212 and feedback process 213. It will be understood that processes herein performed by container host computer environments 210A-210Z can be performed by one or more computing node 10 running one or more program.

Container host computer environments 210A-210Z running host process 211 can include respective container host computer environments 210A-210Z performing functions defining the respective container computer environment as a container host computer environments. Functions defining a container host computer environment as a container host computer environment can include, e.g., supporting the deployment and management of containerized applications through various key functions such as running containers with specified configurations and resource allocations, ensuring isolation via namespaces and control groups. Functions defining a container host computer environment as a container host computer environment can additionally or alternatively include managing networking by assigning IP addresses and enabling communication between containers and external networks, while handling storage by mounting volumes and managing persistent data. The host oversees image management by downloading, storing, and caching container images from repositories. Functions defining a container host computer environment as a container host computer environment can additionally or alternatively include tracking container performance and resource usage with logging and monitoring capabilities, integrating with external tools for comprehensive visibility. Functions defining a container host computer environment as a container host computer environment can additionally or alternatively include providing measures include enforcing access controls, running containers with minimal privileges, and scanning for vulnerabilities. Functions defining a container host computer environment as a container host computer environment can additionally or alternatively include Integrating with orchestration platforms and automating lifecycle management, scaling, and high availability. Functions defining a container host computer environment as a container host computer environment can additionally or alternatively include handling the entire container lifecycle, including creation, start, stop, restart, and deletion, ensuring minimal downtime during updates. Functions defining a container host computer environment as a container host computer environment can additionally or alternatively include managing configurations, environment variables, and secrets to ensure containers run with necessary settings. Functions defining a container host computer environment as a container host computer environment can additionally or alternatively include providing fault tolerance and recovery mechanisms to maintain application availability and resilience by detecting and recovering from failures. Functions defining a container host computer environment as a container host computer environment can additionally or alternatively include building custom container images from configuration files, tailoring them to specific application needs. These dynamic functions ensure that containerized applications run efficiently, securely, and reliably. In one embodiment container host computer environments 210A-210Z can build container images by running of a container text-based build file. In the case a DOCKER® container platform is used, the text-based build file can be provided by a "DOCKER R file" (DOCKER R is a registered trademark of Docker, Inc.). A built container image can include, e.g., code, libraries, configuration files, and environment variables.

Container host computer environments 210A-210Z performing intent graph generating process 212 can include a container host computer environments 210A-210Z generating a user intent graph from text-based data received from a user that defines the container image request. Container host computer environments 210A-210Z running graph generating process 212 can include, e.g., container host computer environments 210A-210Z querying a predictive model that has been trained to produce predictions as to user intent based on input text that has been received from the user. Container host computer environments 210A-210Z running feedback process 213 can include the container host computer environments 210A-210Z collecting feedback data that characterizes performance of a deployed and running container after deployment of the container. Container host computer environments 210A-210Z running feedback process 213 can include the container host computer environment collecting both observability data and user-specified performance data and storing such observability data and user-specified data in monitoring area 2223. Container host computer environments 210A-210Z running graph generating process 212 can include container host computer environments 210A-210Z processing text by natural language processing (NLP). Text processed by NLP can include container image manifest text and container image history text. NLP can include the use of various technologies like machine learning, deep learning (including neural networks and transformers), and specialized libraries such as NLTK and SpaCy. NLP can employ models like BERT and GPT, tools like Gensim for topic modeling, and word embedding techniques like Word2Vec. Container host computer environments 210A-210Z processing text by natural language processing (NLP) can include container hub computer environment querying one or more LLM that has been trained by fine tuning training, such as LLM 3104, as set forth herein.

Figures 2A, 2B:
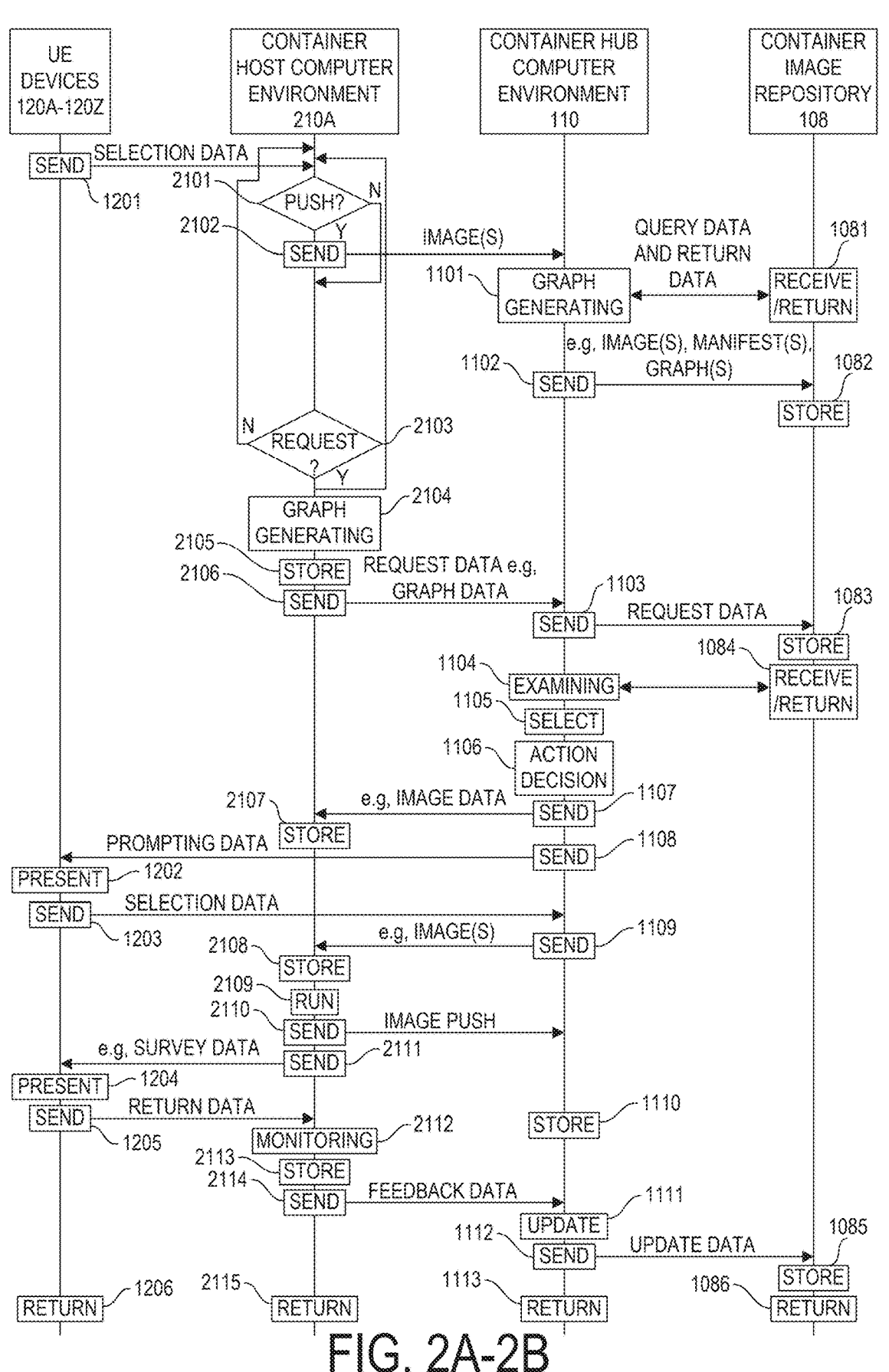
FIG. 2A-2B is a flowchart depicting a method for performance by container hub computer environment interoperating with a container host computer environment and UE devices according to one embodiment.

A method for performance by container hub computer environment 110 interoperating with container host computer environments 210A, UE devices 120A-120Z in container image repository 108 of container hub computer environment 110 is set forth in reference to the flowchart of FIG. 2A to 2B. The functions described with reference to container host computer environment 210A are understood as being representative of container host computer environments 210A-210Z.

At block 1201, UE devices 120A-120Z can be sending selection data to container host computer environment 210A. Selection data sent at block 1201 can include, e.g., selection data specifying a directive to push one or more container image of container images area 2221 to container hub computer environment 110 or selection data can specify selection data to request building of a new container image for deploying and running within a respective container host computer environment of container host computer environments 210A-210Z, i.e., container host computer environment 210A in the described example.

On receipt of the selection data sent at block 1201, container host computer environment 210A at push determination decision block 2101 can ascertain whether the selection data is selection data specifying push of a previously built container image to container hub computer environment 110.

If yes, container host computer environment 210A at send block 2102 can send one or more selected container image to container hub computer environment 110. In response to images being sent and pushed at send block 2102, container hub computer environment 110 can proceed to graph generating block 1101. At graph generating block 1101, container hub computer environment 110 can generate an image graph of the received and pushed container image pushed at blocks 2102. At graph generating block 1101, container hub computer environment 110 can, in one embodiment, generate graphs for a plurality of container images that have accumulated in images area 2121, e.g., received over time from various container host computer environments 210A-210Z or, e.g., as authored by an administrator user associated to container hub computer environment 110.

Container hub computer environment 110 performing graph generating at block 1101 can include iterative queries of container image repository 108, as indicated by receive and return block 1081 of container image repository 108.

At graph generating block 1101, container hub computer environment 110 can generate an augmented manifest of a container image and can generate a container image graph in dependence on the augmented manifest. When a container image pushed to container hub computer environment 110 or otherwise stored in images area 2121, container image manifest associated to the container image can be stored in manifests area 2122 of container image repository 108. A container image manifest can contain essential metadata about a container image, including the schema version, media type, configuration details (media type, size, and digest), and layers (media type, size, and digest). It may also include optional annotations for additional metadata, platform specifications (architecture, OS, and variant), and a history of image creation steps. This information enables tools like DOCKER® and KUBERNETES® to pull and use the image effectively. KUBERNETES® is a registered trademark of the Linux Foundation.

At graph generating block 1101, container hub computer environment 110 can produce augmented manifest data defining an augmented container image manifest. An example of an augmented container image manifest is shown in Table A.

TABLE A

| docker/podman manifest inspect imageA:1.1 |
|---|

```
{
    "schemaVersion": 2,
    "mediaType": "application/vnd.docker.distribution.manifest.list.v2+json",
    "manifests": [
        {
            "mediaType": "application/vnd.docker.distribution.manifest.v2+json",
            "size": 2639,
            "digest":
    "sha256:50b4f8367e33ec24108e9f4847013c1d9ad7a2a15666a349cbd4df7f85c8166f",
            "platform": {
                "architecture": "amd64",
                "os": "linux"
        }
        "layer-labels": {
            "layer 0": {
                "operations": {
                    "set configure nginx path": "ENV NGINX_CONF_PATH
                /etc/nginx/nginx.conf"
                }
                "aspects": ["performance", "function"]
            },
            "layer 2": {
                "operations": {
                    "install curl": "apt-get install –y curl wget openssl vim",
                    "install openssl": " apt-get install –y curl wget openssl vim"
                }
                "aspects": ["function"]
            },
            "layer 3": {
                "operations": {
                    "configure gzip": "sed –i 's/#gzip/gzip/g' $NGINX_CONF_PATH",
                    "configure server_tokens": "sed –i 's/# server_tokens/server_tokens/g'
                    $NGINX_CONF_PATH"
                }
                "aspects": ["security"]
            },
            ......
    },
```

TABLE A-continued docker/podman manifest inspect imageA:1.1

```
{
        "mediaType": "application/vnd.docker.distribution.manifest.v2+json",
        "size": 3062,
        "digest":
"sha256:aca640707d827b2b613bfc32b1ffbdf983790276374e33dfe03f8c3d0bd1f7e8",
        "platform": {
            "architecture": "arm64",
            "os": "linux"
    }
    }
 ]
}
```

An augmented container image manifest can include various container image labels that are categorized under various attribute categories of the container image. In reference to Table A, wherein augmented manifest is indicated depicted in bold font, it is seen that an augmented container image manifest can specify, e.g., the additional descriptor label "set configure nginx path" under the "performance" functional attribute categories, the additional descriptor labels "install curl" and "install openssl" under the "function" attribute category, and the additional descriptor labels "configure gzip" and "configure server_tokens" under the "security" container image attribute category.

As seen in the example of Table A, descriptor labels can be provided under one of N container image attribute categories, wherein the labels are categorized under one of N categories. In one embodiment, the N categories can include, e.g., a container image "function" category, a container image "performance" category, and a container image "security" category.

In one aspect for producing enhanced manifest data, container hub computer environment 110 at graph generating block 1101 can scan a native manifest for any references to layers of a container image associated to the manifest and can, based on the layer identifying information, recover additional information of the layer. For obtaining additional information of a reference layer, container hub computer environment 110 at graph generating block 1101 can run a container history command, e.g., 'Docker history' in DOCKER® for recovery of additional information of the layer. A native container image manifest can contain essential metadata about a container image, including the schema version, media type, configuration details (media type, size, and digest), and layers (media type, size, and digest). It may also include optional annotations for additional metadata, platform specifications (architecture, OS, and variant), and a history of image creation steps. This information enables tools like DOCKER® and Kubernetes to pull and use the image effectively. Running a container history command can return a detailed history of an image, including details on layers making up an image. Returned data returned from a container history command can include returned data as summarized in Table B.

Returned data returned by running a container history command can provide a clear, chronological view of how the image was built, including the commands executed and the size of each resulting layer.

Figure 3A:
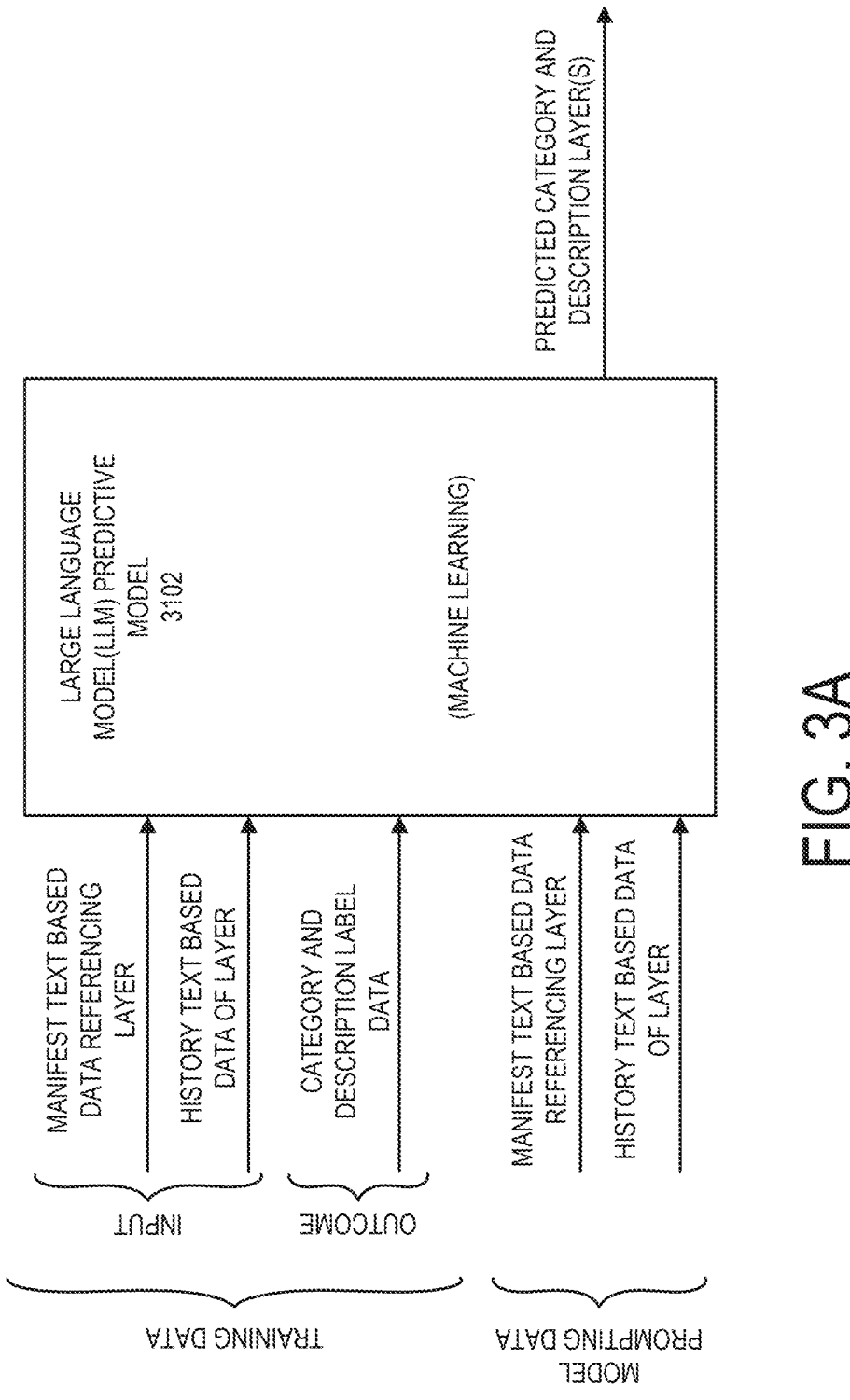
FIG. 3A depicts a trained predictive model trained by machine learning according to one embodiment.

Container hub computer environment 110 producing the augmented manifest of Table A, can include container hub computer environment 110 querying a large language model (LLM) 3102 as shown in FIG. 3A. Referring to FIG. 3A, LLM 3102 can be trained with iterations of training data and once trained can be configured to be responsive to query data.

Referring to LLM 3102, LLM 3102 can be provided by a foundational language model which has been subject to fine tuning training to define LLM 3102. Pre-training LLM 3102 using self-supervised learning can include various methods that utilize unlabeled data to generate useful representations. Methods can include, e.g., Masked Language Modeling (MLM), where random words in the text are masked and the model is trained to predict them, as used in BERT and/or Autoregressive Language Modeling, where the model predicts the next word in a sequence based on previous words. Next Sentence Prediction (NSP) can also or alternatively be employed, which trains the model to understand sentence relationships by predicting if one sentence follows another, also used in BERT. The described functions leverage the structure of the text itself to create learning objectives, enabling the model to learn contextual representations of language without requiring manually labeled data.

Fine tuning training of LLM 3102 can include subjecting LLM 3102 to supervised learning with use of iterations of fine-tuning training data, wherein Iterations of fine-tuning training data for fine-tune training of LLM 3102 can include, for historical container images used for training, (a) training data input data and (b) training data outcome data. The (a) training data input data can include (i) text-based layer data of a native manifest for a certain layer, and (ii) text-based layer of the certain layer returned from running a container history command. The (b) outcome data of each respective training data iteration can be provided by user defined label data that specifies a category and descriptor for the layer data of the given training data iteration. Trained as described with use of an appropriate volume of historical container images,

TABLE B

IMAGE: The ID of the image or layer.

CREATED: The time when the layer was created.

CREATED BY: The command that was used to create the layer.

SIZE: The size of the layer.

COMMENT: Any additional information or comments associated with the layer.

LLM 3102 learns a relationship between native manifest data as augmented with history data, and categorized descriptor labels that are desired to be extracted for facilitation of comparing container images to user intent. Trained as described with use of an appropriate volume of historical container images, the trained LLM 3102 can be configured to be responsive to query data provided by model prompting data.

Query data for querying LLM 3102 can include the combination, for currently pushed container image, the combination of (i) native manifest text-based data referencing a layer, and (i) history command derived text-based data of the referenced layer of (i). Output data output from the input query data defining model prompting data can include predicted descriptor labels and predicted container image attribute categories for layers of the pushed container image. The querying can be performed for each layer of a pushed container image.

Trained as described, LLM 3102 can be employed for production of the enhanced manifest data shown in Table A. Container hub computer environment 110 with enhanced manifest data produced, can generate at graph generating block 1101, relationship graph as depicted in FIG. 4A.

Figure 4A:
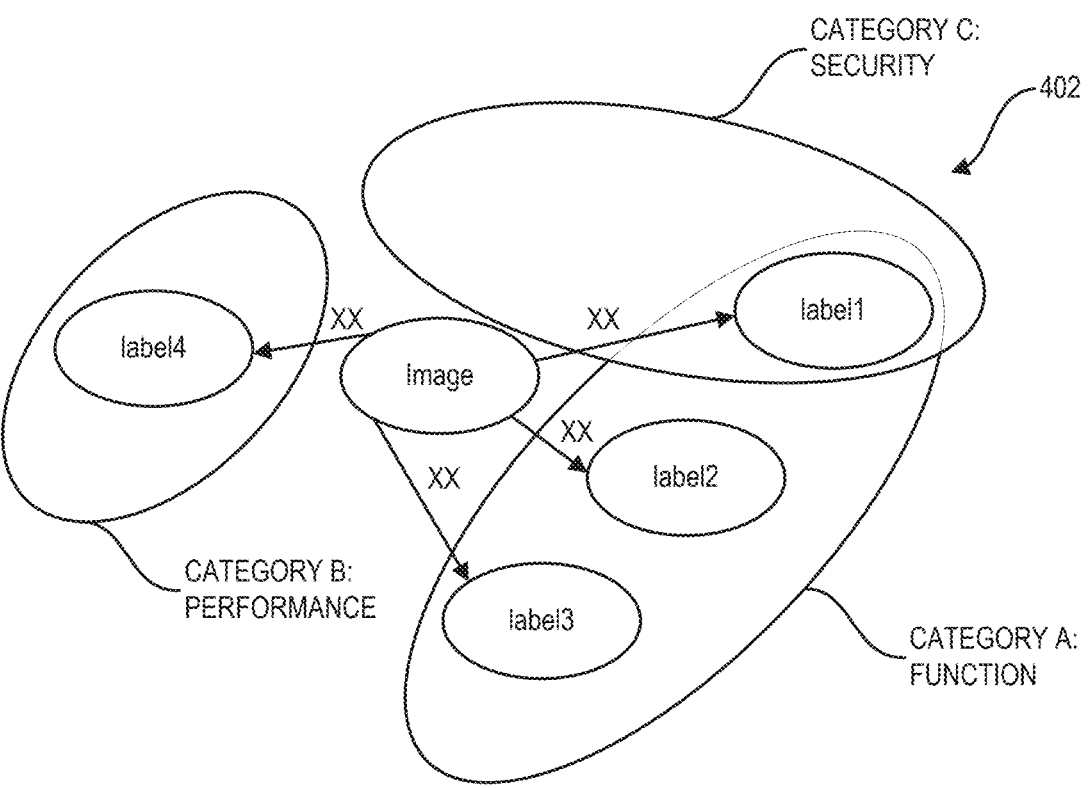
FIG. 4A depicts a container image relationship graph according to one embodiment.

Referring to FIG. 4A, the image graph depicted in FIG. 4A maps to the augmented container image manifest depicted in Table A. In reference to the image graph of FIG. 4A, the attribute category A can be the category "function", the attribute category B can be the attribute category "performance", and the attribute category C can be the attribute category "security".

In a further aspect, edge weights (depicted with the reference indicators 'XX' of container image relationship graph 402 can be initialized with initial values of 1.0. In one aspect as set forth herein, container hub computer environment 110 can adjust the edge weight values of container image relationship graph 402 over time. In one embodiment, container hub computer environment 110 at each iteration of block 1101 can subject all prior stored container image relationship graphs stored in image graphs area 2123 for processing that can update edge weights 'XX' in a manner set forth herein.

On completion of graph generating block 1101, container hub computer environment 110 can proceed to send block 1102. At send block 1102, container hub computer environment 110 can send various data to container image repository 108 for storage in storage block 1082. Such data sent for storage at storage block 1102 can include, e.g., container images, such as contained images pushed at send block 2102, manifests associated with such pushed container images and graphs generated at graph generating block 1101.

Referring again to send block 1201 of the flowchart of FIG. 2A-2B, selection data sent by UE devices 120A-120Z at send block 1201 can include selection data designating a pushed image, or selection data designating specifying a request for a new container image. Container host computer environment 210A on determining at block 2101 that a push request has not been made can proceed to block 2103 to determine whether a container image building request has been received.

On determining that a container image building request has been received based on the selection data sent at block 1201, container host computer environment 210A can proceed to intent graph generating block 2104. Even on determining that a container image build request is been received, container host computer environment 210A can return to a stage preceding block 2101 to continue to process new selection data sent at block 1201.

Container host computer environment 210A at intent graph generating block 2104 can generate an intent graph representing a user intent in respect to building a container image. Embodiments herein recognize that persons with little or no development experience may have difficulty in building container images suiting a user's needs. Embodiments herein recognize that building high-performance container images can often require extensive knowledge of container images and container engines. Embodiments herein can facilitate the building of high-quality container images without extensive background knowledge of container images and container engines. Embodiments herein can accommodate entry of free-form text by user that specifies container image description of a container image that a user would like to build. Based on entry of such free-form text by a user, system 100 can generate an intent relationship graph for comparison to one or more previously generated container image graph. System 100 can identify a base image for use by the user in response to the described comparison.

Figure 5:
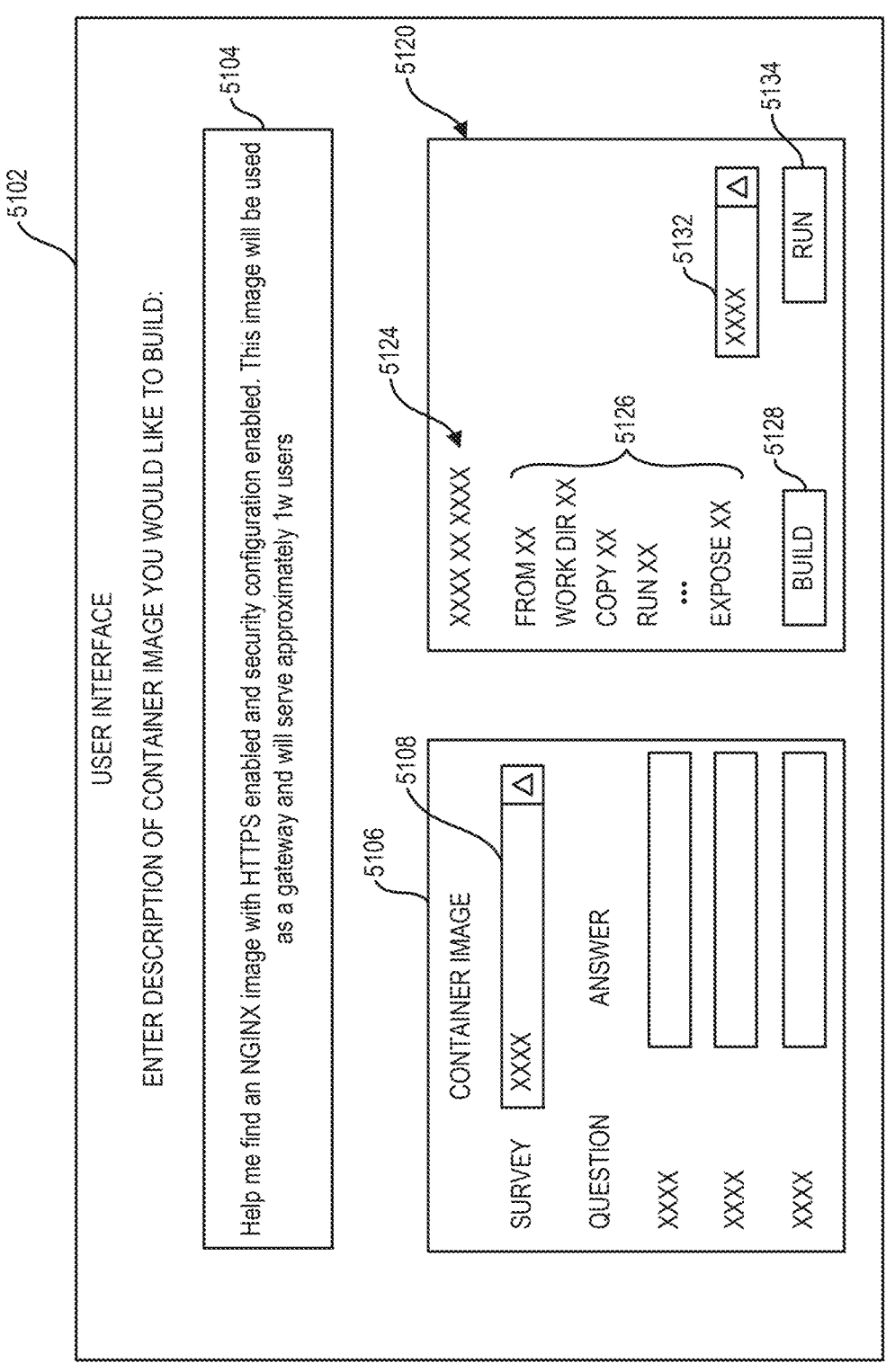
FIG. 5 depicts the user interface according to one embodiment.

Embodiments herein can include use of user interface 5102 as set forth in FIG. 5. User interface 5102 can be a displayed user interface displayed on one or more UE device of UE devices 120A-120Z, e.g., configured with use of one or more served user interface webpage served by container host computer environment 210A. Referring to user interface 5102, user interface 5102 as shown at FIG. 5 can include text entry area 5104 that facilitates the user entry of text describing a container image that a user would like to build.

System 100 can be configured so that the user can enter free-form text into text entry area 5104. Configuring system 100 so that system 100 accommodates the entry of free-form text can improve the quality of container images built with use of system 100 even where administrator user using user interface 5102 have limited or no experience with container image building or container engines.

Figure 3B:
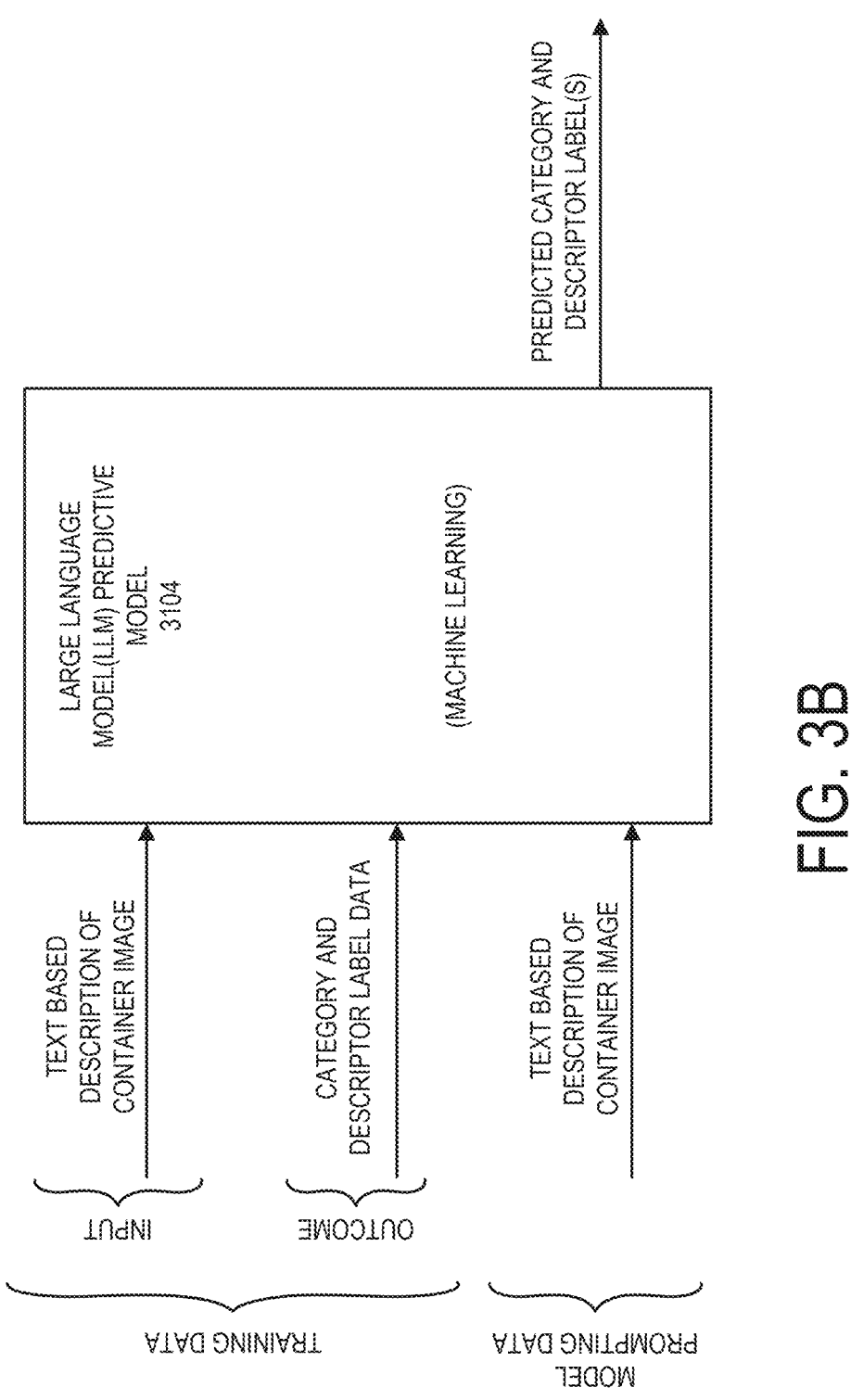
FIG. 3B depicts a trained predictive model trained by machine learning according to one embodiment.
Figure 3C:
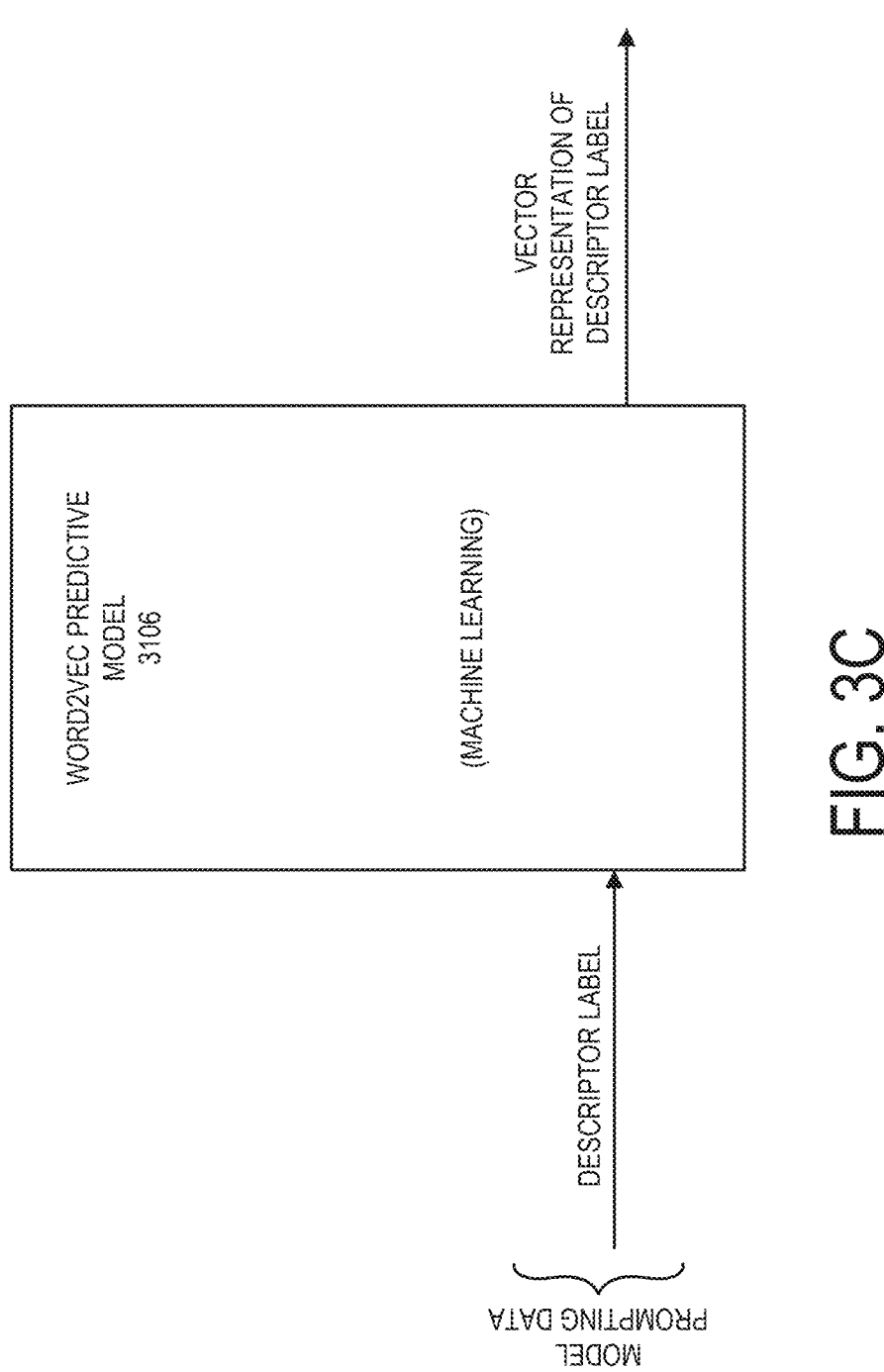
FIG. 3C depicts a train predictive model trained by machine learning according to one embodiment.

For generating an intent graph at intent graph generating block 2104, container host computer environment 210A at block 2104 can query trained predictive model 3104 of FIG. 3B for return of predicted attribute category labels and descriptor labels associated to the text-based data entered by user into text entry block 5104 of user interface 5102.

Regarding predictive model 3104 of FIG. 3B, predictive model 3104 can be provided by a large language model (LLM) that has been previously trained with iterations of training data. Referring to LLM 3104, LLM 3104 can be provided by a foundational language model which has been subject to fine tuning training to define LLM 3104. Pre-training LLM 3104 using self-supervised learning can include various methods that utilize unlabeled data to generate useful representations. Methods can include, e.g., Masked Language Modeling (MLM), where random words in the text are masked and the model is trained to predict them, as used in BERT and/or Autoregressive Language Modeling, where the model predicts the next word in a sequence based on previous words. Next Sentence Prediction (NSP) can also or alternatively be employed, which trains the model to understand sentence relationships by predicting if one sentence follows another, also used in BERT. The described functions leverage the structure of the text itself to create learning objectives, enabling the model to learn contextual representations of language without requiring manually labeled data.

Fine tuning training of LLM 3104 can include subjecting LLM 3104 to supervised learning with use of iterations of fine-tuning training data. LLM 3104 can be trained with iterations of fine-tuning training data. Iterations of fine-tuning training data for training LLM 3104 can include (a) input training data and outcome training data (b). Training data for training LLM can include historical instances of users entering text-based data describing container images desired to be built, i.e., text-based data emulating instances of data entry into text entry area 5104. The historical instance to user entered text can be collected from instances of user interface 5102 presented to a plurality of users by a plurality of container host computer environments 210A-210Z. An iteration of (a) input training data can include a text-based description of a container image to be built defining an input text string, and an iteration (b) of outcome training data in the iteration of training data be category labels and descriptor label associated to various words of the input text string of (a) as specified by one or more administrator user.

With LLM 3104 trained as described, LLM learns a relationship between input text strings and output labels that can facilitate comparison between user intent and stored container images. With LLM 3104 trained as described, LLM 3104 can be responsive to model prompting data defining query data. Trained as described, LLM 3104 can predict category and descriptor labels associated to various text segments of the text string entered into text entry area 5104.

In the described scenario described with reference to user interface 5102, model prompting data for querying LLM 3104 can be provided by the text-based data entered by the user into text-based text entry area 5104 of user interface 5102. With the described query data input into LLM 3104, LLM 3104 can output predicted descriptor labels that belong to predicted intent attribute category labels.

According to one aspect of system 100, LLM 3104 can be trained and configured so that predicted category labels output by LLM 3104 map to category labels provided for training of LLM 3104 employed for predicting category labels of container images stored in container images area 2121 of container image repository 108. The described coordinated training between LLM 3104 and LLM 3102, wherein each LLM 3102 and 3102 is trained to produce, based on differentiated model prompting data, predictive labels of common categories facilitates comparison between stored container images stored in container image repository 108 and an intent of a user who wishes to build a container image as expressed with text-based data entered into text entry area 5104. Based on the predicted labels described predicted category and descriptor labels output by LLM 3104 container host computer environment 210A can generate relationship graph 404 as depicted in FIG. 4B.

Figure 4B:
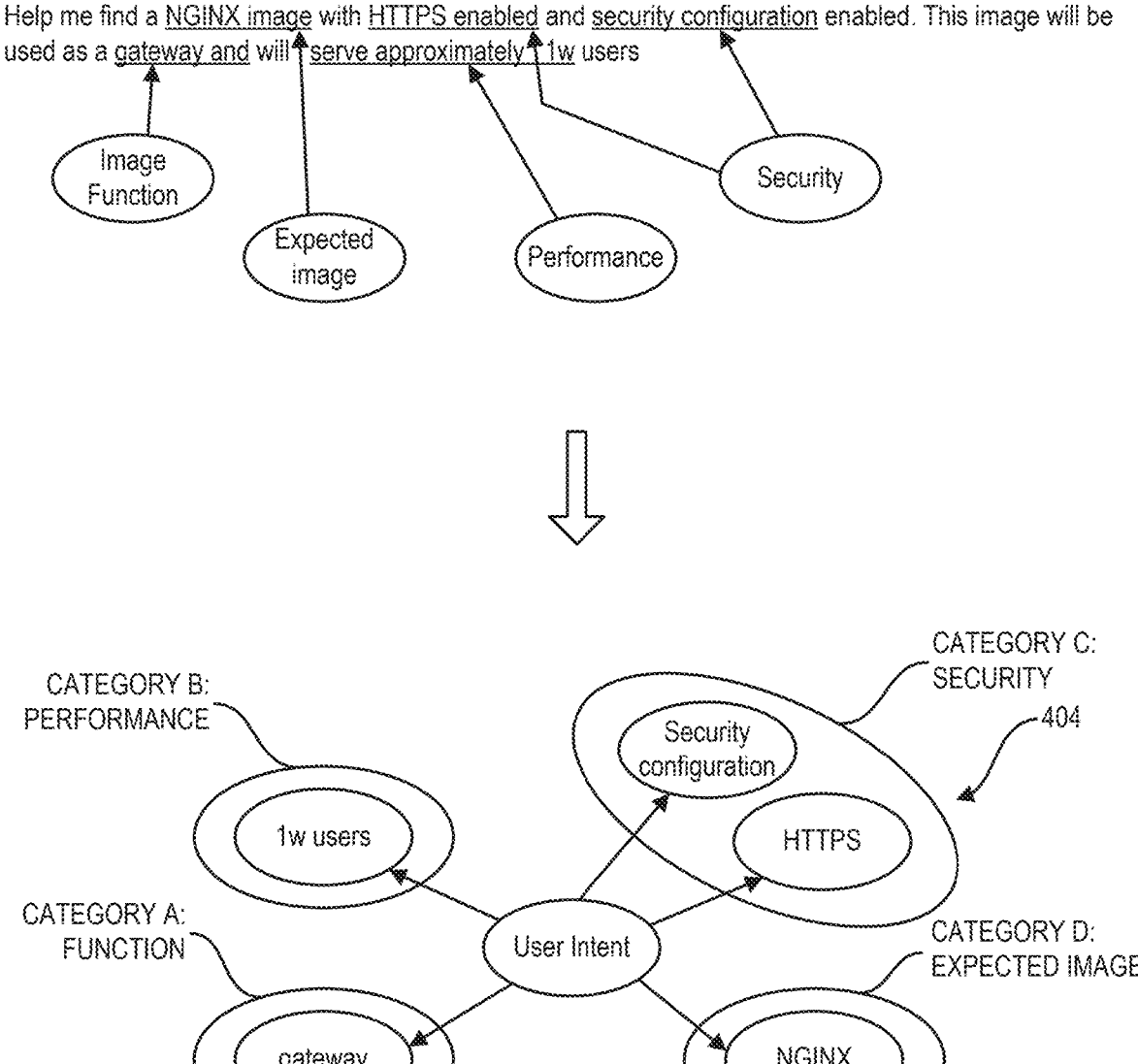
FIG. 4B depicts generation of a user intent relationship graph according to one embodiment.

Predicted category and descriptor labels output by LLM 3104 are described further in reference to FIG. 4B depicting an intent relationship graph 404 produced based on predicted labels output by LLM 3104.

In reference to FIG. 4B, LLM 3104 can predict the descriptor label "gateway" for the category label "function", can predict the descriptor label "1 W users" for the intent attribute category label "performance" and can predict the descriptor labels "security configuration" and "HTTPS" for the predicted intent attribute category label of "security". In another aspect, LLM 3104 can be trained to extract a descriptor for the intent attribute category "expected image" based on a text string entered into text entry area 5104. Referring to FIG. 4B, LLM 3104 can predict the descriptor label "NGINX" for the attribute category label "expected image" as shown in FIG. 4B.

The predicted attribute categories of a user's intent can map to and be in common with the predicted categories of container image relationship graph 402 set forth in FIG. 4A. On completion of graph generating block 2104, container host computer environment 210A can proceed to store block 2105. At store block 2105, container host computer environment 210A can store the generated user intent relationship graph generated at graph generating block 2104 into images area 2221 of host repository 208. On completion of store block 2105, container host computer environment 210 can proceed to send block 2106. At send block 2106, container host computer environment 210A can send container image request data for receipt by container hub computer environment 110.

The request data sent at block 2106 can include, e.g., the graph data generated at graph generating block 2104. On receipt of the request data, e.g., including the graph data, container hub computer environment 110 at send block 1103 can send the request data to container image repository 108 for storage by container image repository 108 at store block 1083.

On completion of send block 1103, container hub computer environment 110 can proceed to examining block 1104. At examining block 1104, container hub computer environment 110 can perform examining of an intent of a user represented in the text-based data entered into text entry area 5104 in combination with container images stored in images area 2121 in order to assign similarity ratings of the user intent in reference to respective one of the container images stored in container images area 2121 of container image repository 108. Examining block 1104 can comprise multiple queries of container image repository, as indicated by receive and return block 1084.

For performing the examining at block 1104, container hub computer environment 110 can compare the just generated relationship graph representing user intent as generated at graph generating block 2104 to previously generated container image relationships graphs generated for respective container images stored in container images area 2121 at graph generating block 1101.

For performing examining of the user intent relationship graph 404 to respective container image relationship graphs of image graphs area 2123 for respective container images of container images area 2121, container hub computer environment 110 at examining block 1104 can utilize Eq. 1.

$$S = FS1\,W1 + FS2\,W2 + FS3\,W3 \qquad \text{(Eq. 1)}$$

Referring to Eq. 1, S can be the overall similarity score of a current user intent relationship graph to a repository stored container image relationship graph being evaluated, factor FS1 can be the similarity between the intent graph in the image graph according to a first factor, factor FS2 can be the similarity of the intent graph and the image graph according to the second factor, and factor FS3 can be a similarity between the intent graph in the image graph according to a third factor, and W1 to W3 can be weights associated to the various factors.

According to one embodiment in accordance with the scenario described in reference to FIG. 2A-2B, factor FS1 can be a similarity factor according to the first common attribute category between intent graph in the image graph, namely, the attribute category "function". The second factor, FS2, can be a similarity according to a second attribute category common between the intent graph and the image graph, namely, the attribute category "performance", and the third factor FS3 can be similarity according to the attribute category common between the intent graph of the image graph, namely, the attribute category "security".

For evaluating similarity under each factor FS1, FS2, and FS3, container hub computer environment 110 can query Word2Vec predictive model 3106 as shown in FIG. 4C. On being queried with the descriptor label, Word2Vec predictive model 3106 can produce a prediction specifying a vector representation of the descriptor label. Thus, word with use of Word2Vec predictive model 3106, container hub computer environment 110 can perform a quantitative comparison in respect to semantic meanings of respective descriptor labels, i.e., a descriptor label of an intent relationship graph and a descriptor label of a container image relationship graph.

In one aspect, Word2Vec predictive model 3106 can be trained with training data in the domain of user descriptions of container images for building of the variety input into text entry area 5104, as well as in the domain of manifest and layer history data used for training LLM 3102. For each factor FS1, FS2, and FS3, container hub computer environment 110 can employ Word2Vec predictive model 3106 for return of a vector representation of a descriptor of an intent relationship graph 404 and also for return of a vector representation of a descriptor label of the image relationship graph being compared in the common category. Container hub computer environment 110 can scale scoring values under factors FS1, FS2, and FS3 in dependence on Euclidean distance between semantic meaning vector representation of compared descriptor labels. Where the compared categories include more than one descriptor label the more than one descriptor label, vector representations of the more than one descriptor labels can be aggregated, e.g., averaged, prior to performing a calculation of Euclidean distance between an intent relationship graph one or more descriptor label and image graph one or more descriptor label.

At examining block 1104, container hub computer environment 110 can assign a similar scores, S, to each relationship graph of image graphs area 2123 and each image stored in images area 2121.

On completion of examining block 1104, container hub computer environment 110 can proceed to select block 1105. At select block 1105, container hub computer environment 110 can select the best fit container image from images area 2121. In one embodiment, container hub computer environment 110 can perform selecting of a base image associated to the user's request exclusively based on the examining performed at examining block 1104, i.e., the container image having the smallest similarity score according to equation one can be selected as the base image associated to the user's request.

In other embodiments, container hub computer environment 110 at select block 1105 can select a base image for the user's container image request expressed with the text string entered into text entry area 5104 in dependence on a plurality of factors. In one embodiment, container hub computer environment 110 at select block 1105 can employ Eq. 2 for selecting a base image for association to users' container image request.

$$R = FR1W1 + FR2W2 + FR3W3 + FR3W3 + FR4W4 \quad \text{(Eq. 2)}$$

Referring to Eq. 2, R can be an overall rating assigned to a candidate container image and image graph being subject to evaluation, FR1 can refer to a first factor, FR2 can refer to a second factor, FR3 can refer to a third factor, FR4 can refer to a fourth factor, FR5 can refer to a fifth factor, and W1-W5 can refer to weights associated to the various factors FR1-FR5.

According to one embodiment, the factor FR1 can be similarity determination factor based on the similarity determination performed at examining block 1104 with use of Eq. 1, and FR2-FR5 can be objective criterion factors.

According to the objective criterion factor FR2, container hub computer environment 110 can evaluate various objective criterion indicative of acceptable performance of a particular container image being evaluated with use of Eq. 2. As noted in reference to FIG. 4B, container host computer environment 210 can extract an expected image descriptor label from the text string entered by user into text entry area 5104 of user interface 5102 of FIG. 6, and container hub computer environment 110 can employ such predicted expected image when performing evaluations with use of Eq. 1 and Eq. 2.

In one aspect, container hub computer environment 110 can employ the expected image classification described in reference to FIG. 4B for filtering out container images and image graphs subject to evaluation with use of Eq. 1. In another aspect, with use of Eq. 2, container hub computer environment 110 can evaluate candidate container images for selection of the base image associated to a user container image request under the objective criteria test of factor FR2. With use of factor FR2, container hub computer environment 110 can evaluate various criterion, e.g., one embodiment factor FR2 can be a download ranking criterion. Container hub computer environment 110 can scale scoring values under factor FR2 in dependence on a download ranking of the container image being subject to evaluation.

According to objective criterion factor FR3, container hub computer environment 110 can scale scoring values under factor FR3 in dependence on whether the candidate container image is or is not an official image. For example, container hub computer environment underscoring factor FR3 can assign a scoring value of 0.7 under factor FR3 where the evaluated container image is an official image and can scale and can assign a scoring value under factor FR3 of 0.3 in the case the container image being evaluated is not an official image.

According to objective criterion factor FR4, container hub computer environment 110 can scale scoring values under factor FR4 in dependence on the completeness level of guidance documentation associated to the container image being evaluated. Where there is complete guidance documentation for particular container image being evaluated, container hub computer environment 110 can assign a scoring value 1.0 for the particular container image being evaluated. Where there is no guidance documentation available for the container image being evaluated, container hub computer environment 110 can assign a scoring value of 0.0 for the particular container image being evaluated.

According to objective criterion factor FR5, container hub computer environment 110 can scale scoring values under factor FR5 in dependence on a level of feedback data received from particular container image where the container feedback data for container images is described in further detail herein.

Where a container image being evaluated under factor FR5 is a new container image newly stored in container images area 2121, container hub computer environment 110 can assign a scoring value under factor FR5 of 0.0 given that there is no feedback available for the particular container image. Where the container image being evaluated under factor FR5 has been subject to extensive feedback at a level greater than a baseline level, container hub computer environment 110 can assign a scoring value under factor FR5 above a baseline scoring value.

At select block 1105, container hub computer environment 110 can select the highest scoring container image under application of Eq. 2 as the base image associated to user's container image request. On completion of select block 1105, container hub computer environment 110 can proceed to action decision block 1106. At action decision block 1106, container hub computer environment 110 can produce an action decision in dependence on the selected base image selected at select block 1105 and based on other conditions. In one example, container hub computer environment 110 can render action decisions at action decision block 1106 in dependence on the degree similarity of the intent graph examined at examining block 1104 to the image graph of the selected base image selected at block 1105 as determined at examining block 1104. Container hub computer environment 110 can employ the decision data structure of Table C for performance of an action decision at block 1106.

TABLE C

| Row | Similarity score, S, between selected base image and user intent | Action Decision |
|---|---|---|
| 1 | S >= 0.9 | Send prompting data prompting user to select base image in full satisfaction of user requirement |
| 2 | S < 0.9 | Send prompting data prompting user to select base image and further prompting for selection of one or more additional layer |

In reference the action decision block 1106, container hub computer environment 110 (Row 1) can return an action decision to recommend the selected base image for completely addressing the user's container image request where a determined similarity of the user's container image request and the selected container base image as determined at examining block 1104 using Eq. 1 satisfies a similarity threshold. However, with reference to the decision data structure of Table C, container hub computer environment 110 (Row 2) can recommend one or more additional container image layer accompany the base image where a similarity between the user's intent and the selected base image does not satisfy the similarity threshold.

On completion of action decision block 1106, container hub computer environment 110 can proceed to send block 1107. At send block 1107, container hub computer environment 110 can send the selected base image to container host computer environment 210A for storage into images area 2221 of host repository 208 at store block 2107. Alternatively, send block 1107 can be avoided and system 100 can rely on the selected base image being sent on completion of a container image build.

On completion of send block 1107, container hub computer environment 110 can proceed to send block 1108. At send block 1108, container hub computer environment 110 can send prompting data prompting a user to build a container image having the selected base image selected at select block 1105.

Figure 6:
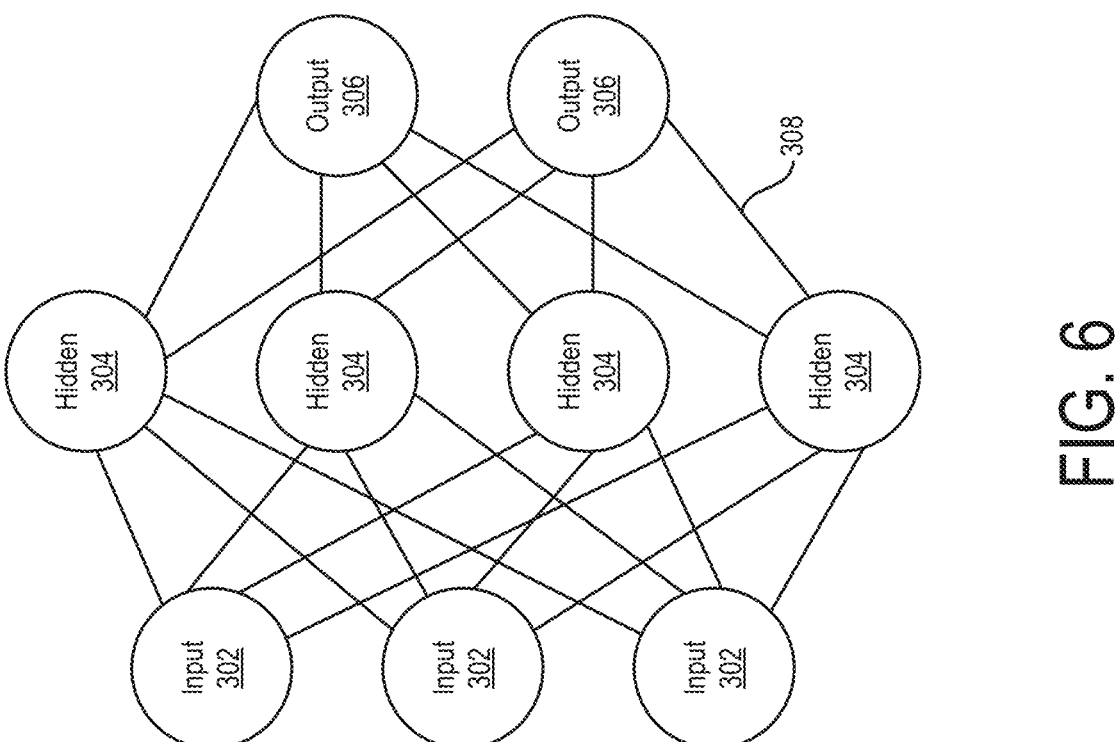
FIG. 6 depicts an artificial neural network (ANN) according to one embodiment.

On receipt of the prompting data, the appropriate UE device of the current user at present block 1202 can display on displayed user interface 5102 of FIG. 6 the transmitted prompting data. Prompting data can include text-based prompting data 5124, and text-based prompting data 5126 presented in development area 5120 of user interface 5102 as shown in FIG. 6.

Prompting data such as text-based prompting data 5124, and/or text-based prompting data 5126 can prompt the user to specify the selected base image container image in a container image build file, e.g., a Docker file in DOCKER®. In one aspect, user interface 5102 can include development area 5120 that facilitates development of a container image build file.

In the case that Row 2 of the decision data structure of Table C is active, the prompting data such as text-based prompting data 5124, and/or text-based prompting data 5126 can recommend one or more additional layers for inclusion in a container build file for further addressing a user's container image build request, the intent of which is represented in intent relationship graph 402. Container hub computer environment 110 with text-based prompting data 5124, and/or text-based prompting data 5126 can prompt a user to add one or more container image layer to the selected container base image as per a recommendation produced by container hub computer environment 110.

For identifying one or more layer for adding to a base image, container hub computer environment 110 at action decision block 1106 can identify all attribute categories of factor FS1, FS2 and FS3 of Eq. 1 where the similarity score rating for a particular attribute category of FS1, FS2, and/or FS3 as between the compared user intent relationship graph 404 and the container image relationship graph 402 for the selected base image failed to satisfy a similarity threshold.

Where similarity score under factor FS1, FS2 and/or FS3 for a particular attribute category fails to satisfy the similarity threshold, container hub computer environment 110 can, with use of the semantic meaning vector representation processing described with reference to Word2Vec predictive model 3106, identify any container image layers of images area 2121 represented in graph form in image graphs area 2123 compatible with the selected base image for a particular attribute category having a threshold satisfying level of semantic similarity with the user's intent descriptors in the identified categories as represented in the user intent relationship graph 404. Based on the described identifying of any container image layers of images area 2121 represented in graph form in image graphs area 2123 compatible with the selected base image for a particular attribute category having a threshold satisfying level of semantic similarity with the user's intent descriptors, container hub computer environment 110 can specify such identified one or more container image layer in the prompting data sent at send block 1108 and presented to a user at block 1202.

Based on the prompting data presented in text-based prompting data 5124, and/or text-based prompting data 5126, a user with use of user interface 5102 can complete authoring of a container build file using development area 5120.

On activation of building, e.g., with use of container image build button 5128 being actuated by the user using user interface 1502, selection data can be sent at send block 1203 defining a container image build command, e.g., 'Docker build' in DOCKER®. In response to receipt of the build command selection data sent at block 1201, container hub computer environment 110 at send block 1109 can send, e.g., container images and other appropriate resource for completion of container image building at container host computer environment 210, and on receipt of the container images and other resources, container host computer environment 210 can store the newly built container image into container images area 2121 of host repository 208.

On receipt of further selection data defining a container image run command, e.g., by activation of run button 5134, container host computer environment 210A can proceed to run block 2109. At run block 2109, container host computer environment 210A can run the newly built container image stored at store block 2108. With the newly built container image running and deployed, container host computer environment 210A can proceed to send block 2110. At send block 2110 container host computer environment 210A can push the newly built container image to container hub computer environment 110 for storage into container images area 2121, and the stored container image can be subject to graph generating at a next iteration of graph generating block 1101. On completion of send block 2110, container host computer environment 210A can proceed to send block 2111.

At send block 2111, container host computer environment 210A can send, e.g., survey data for presentment at survey area 5106 of user interface 5102 as shown in FIG. 6. The survey data can be presented at present block 1204 in survey area 5106. In response to the presentment of the survey data, the appropriate UE device of UE devices 120A-120Z at send block 1205 can send survey return data as defined by the user of user interface 5102 responsively to the presented survey data.

Survey data presented in survey area 5106 can include survey data requesting the user to specify, e.g., how well the newly deployed container satisfies intent expressed by the user across the various described attribute categories as originally expressed in the text entry area 5104.

In one aspect, over the course of deployment of container host computer environment 210A and associated UE devices 120A-120Z, surveys for various deployed containers can be presented with an identifier for the current container image and associated running container specified in a selectable with use of selection area 5108. On receipt of the return data sent at block 1205, container host computer environment 210A can perform monitoring of the return data at monitoring block 2112.

At monitoring block 2112, container host computer environment 210 can generate monitoring data for storage into monitoring area 2223. Monitoring data of monitoring area 2223 can include, e.g., observability data defined, e.g., by logging data metrics data and/or trace data as well as user specified data defined by the described survey return data that specifies attributes of performance of the containers running within respective ones of container host computer environments 210A-210Z. On completion of monitoring block 2112, container host computer environment 210A can proceed to store block 2113. At store block 2113, container host computer environment 210A can store obtained monitoring data in monitoring data area 2223. On completion of store block 2113, container host computer environment 210A can proceed to send block 2114. At send block 2114, container host computer environment 210A can send feedback data for receipt by container hub computer environment 110.

Feedback data sent at block 2113 can include, e.g., observability data defined, e.g., by logging data, metrics data and/or trace data of hosted containers running within container host computer environment 210A as well as user specified data that specifies attributes of performance of the containers running within respective ones of container host computer environment 210A.

On receipt of the feedback data, container hub computer environment 110 at update block 1111 can store the feedback data to image graphs area 2123 and can perform updating of image graphs stored in image graphs area 2123 in dependence on feedback data sent at block 2113. Updating at update block 1111 can be performed in dependence on observability data and/or user specified data, e.g., as defined by return survey data.

In one aspect of send block 2114, container host computer environment 210A can push observability data and/or user specified data, e.g., survey data for plurality of historical container images that have been hosted and deployed over time by container host computer environment 210A, even where the deployed container image has been surveyed one or more times previously. In this way, system 100 builds a historical record of observability data and user specified data, e.g., survey data of containers over time which historical record can result in an image relationship graph for a container image changing over time. Based on feedback day defined by observability data and user specified data, e.g., survey data sent at block 2114, container hub computer environment 110 at update block 1111 and/or a next iteration of graph generating block 1101 can change weights 'XX' of the various edges of container image relationship graph 402 as shown in FIG. 4A.

Further, it will be noted that image relationship graph edge weights of container image relationship graph 402 can be updated over time by feedback data defined by observability data and/or user specified data pushed from different enterprises of different computer environments 210A-210Z as described in FIG. 1. In one aspect of updating at block 1111, container hub computer environment 110 can adjust edge weights 'XX' of edges of container image relationship graph, such as relationship graph 402 based on observability data, e.g., metrics and/or logging data. For example, where feedback data indicates that a container defined by a runtime instance of a container image has a number of end-users less than a targeted number of end-users or if the container was decommissioned within a threshold satisfying period of time, container hub computer environment 110 at update block 1111 can reduce edge weights 'XX' of container image relationship graph 402 accordingly.

On completion of update block 1111, container hub computer environment 110 can proceed to send block 1112. At send block 1112, container hub computer environment 110 can send updated image relationship graph data to container image repository 108 for storage into image graphs area 2123 of container image repository 108 at store block 1085.

On completion of send block 2114, container host computer environment 210A can proceed to return block 2115. At return block 2115, container host computer environment 210A can return to a stage prior to decision block 2101 to wait for the next selection data defined by users of UE devices 120A-120Z. Embodiments herein recognize that container host computer environment 210A can iteratively perform the loop of blocks 2101 to 2115 for deployment period of container host computer environment 210A. Further, container host computer environment 210A can be performing multiple instances of the loop of blocks 2101 to 2115 simultaneously and concurrently. Further, each container host computer environment of container host computer environments 210A-210Z can be performing multiple instances of the loop of blocks 2101 to block 2115 simultaneously and concurrently. Further, by the described current simultaneous instances of the loop of blocks 2101 to 2115, edge weights of image relationship graphs such as relationship graph 402 can be subject to updating by feedback data specified by multiple users and/or by feedback data provided by multiple instances of observability data on different runtime instances of a container image, e.g., running containers defined by runtime instances of a container image running in different ones of container host computer environments 210A-210Z.

On completion of send block 1112, container hub computer environment 110 can proceed to return block 1113. At return block 1113, container hub computer environment 110 can return to a stage preceding block 1101 and container hub computer environment 110 can iteratively perform the loop of blocks 1101 to 1113 during a deployment period of container hub computer environment 110. Further, container hub computer environment 110 can be simultaneously and concurrently performing multiple instances of the loop of blocks 1101 to block 1113.

On completion of store block 1085, container image repository 108 can proceed to return block 1086. At return block 1086, container image repository 108 can return to a stage preceding receive return block 1081 and container image repository 108 can iteratively be performing the loop of blocks 1081 to 1086 during the deployment period of container image repository.

The appropriate UE device of UE devices 120A on completion of send block 1205 can proceed to return block 1206. At return block 1206, UE devices 120A-120Z can return to a stage preceding send block 1201 and UE devices 120A-120Z can iteratively be performing the loop of blocks 1201 to 1206 during the deployment period of UE devices 120A-120Z.

Embodiments herein recognize that because edge weights 'XX' of a container image relationship graph, such as relationship graph 402 as set forth in FIG. 4A can iteratively change over time, examining by container hub computer environment 110 of a particular container image having an associated image graph and image graphs area 2123 can change over time as the edge weights 'XX' of the image graph relationship graph change over time.

When edge weights 'XX' of container image relationship graph 402 are changed, container hub computer environment 110 can determine that there is a changed semantic meaning Euclidean distance between compared text-based descriptor labels when evaluating factors FR1, FR2, and/or FR3 of Eq. 1.

According to one example, a certain text string can be entered into text entry area 5104 at time t=T. And responsively, container hub computer environment 110 can select the container image identified by the container image ID 'XXY' as the base image associated to the user request. However, at time t=T+1, e.g., one week later, the identical certain text string can again be entered into text entry area 5104 with the different container image being selected by container hub computer environment 110 as the base image.

There are a number of reasons why container host computer environment 110A can select a different container image as the base image for a user between times t=T and times t=T+1, even though identical text is entered into text entry area 5104 at time t=T and time t=T+1. In one example, between time t=T and t=T+1, another container image having increased similarity to the extracted user intent expressed in a generated relationship graph 404 may have been newly stored within images area 2121. Container hub computer environment 110 can select such newly stored container image as the base image using Eq. 2 based on the newly stored image having increased similarity with the user's intent in accordance with an evaluation using Eq. 1.

In another example, user specified feedback data and/or observability data feedback data for the previously selected base image container image 'XXY' accumulated between time t=T and time t=T+1 may have resulted in one or more edge weight 'XX' of the relationship graph 402 for the container image 'XXY' being reduced. The reduction in the one or more edge weight may have resulted in a lower similarity score for the previously selected container image 'XXY' under Eq. 1 and accordingly selection of a different container image as the base image on application of Eq. 2.

Various available tools, libraries, and/or services can be utilized for implementation of trained predictive models herein trained by machine learning. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. According to one possible implementation, a machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. Trained predictive models herein can employ use, e.g., of artificial neural networks (ANNs) support vector machines (SVM), Bayesian networks, regression-based models, and/or other machine learning technologies.

FIG. 6 is an illustration of an example ANN architecture for trained predictive models herein.

One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons.

Referring now to FIG. 6, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Weighted connections 308 between the input neurons 302 and hidden neurons 304 are weighted, and these weighted inputs are then processed by the hidden neurons 304 according to some function in the hidden neurons 304. There can be any number of layers of hidden neurons 304, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "backpropagation" computation, where the hidden neurons 304 and input neurons 302 receive information regarding the error propagating backward from the output neurons 306. Once the backward error propagation has been completed, weight updates are performed, with the weighted connections 308 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output, which can be referred to as outcome training data as referenced in connection with predictive models herein. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process can continue until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, weights of weighted connections 308 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, weights of weighted connections 308 may be implemented as resistive processing units (RPUs), generating a predictable current output when an input voltage is applied in accordance with a settable resistance.

Certain embodiments herein may offer various technical computing advantages involving computing advantages to address problems arising in the realm of computer systems. Embodiments herein can facilitate building of container images aligned to user intent and where a user has limited or no familiarity with building container images. Embodiments herein can subject text-based data specifying attributes of a desired container image for building to natural language processing and can further subject to natural language processing text-based data describing attributes of container images stored in a container image repository of a container hub computer environment. In one aspect, text-based data entered by a user into a user interface that describes attributes of a container image for building can be input as query data to a pre-trained machine learning pre-trained predictive model trained to predict descriptive labels across attribute categories of the user entered text string. Further, text-based data describing container images that are stored in a container image repository can be input as query data into a machine learning predictive model that has been trained to predict descriptor labels across various container image attribute categories that map to the category attributes associated to the user input text string. The providing of the map attribute categories facilitates comparison between current between intent associated to a current user input text string and container images prestored within a container image repository. Feedback data on deployed images can be collected over time, e.g. from users of the deployed container images and from observability data agents that generate observability data from deployed containers defined by runtime instances of container images. The feedback data can be used to adjust attributes of container image relationship graphs associated to respective container images stored within container image repository. Embodiments herein can include generating the user intent relationship graph based on the predicted descriptor labels across attribute categories from a user input text string and generating container image relationship graphs for respective container images stored within a container image repository. Embodiments herein for comparing a user intent to various stored container images, embodiments herein can include comparing a generated intent relationship graph associated to user text string describing container image for building to generated container image relationship graphs that have been generated for plurality of container images stored in a container image repository. By leveraging data structures to organize relationships, the techniques described herein can increase efficiency in locating relevant content that can be extracted for presentment to interfaces, including user and process interfaces, described herein. Decision data structures as set forth herein can be updated by machine learning so that accuracy and reliability is iteratively improved over time without resource consuming rules intensive processing. Machine learning processes can be performed for increased accuracy and for reduction of reliance on rules-based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer-based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-

Figure 7:
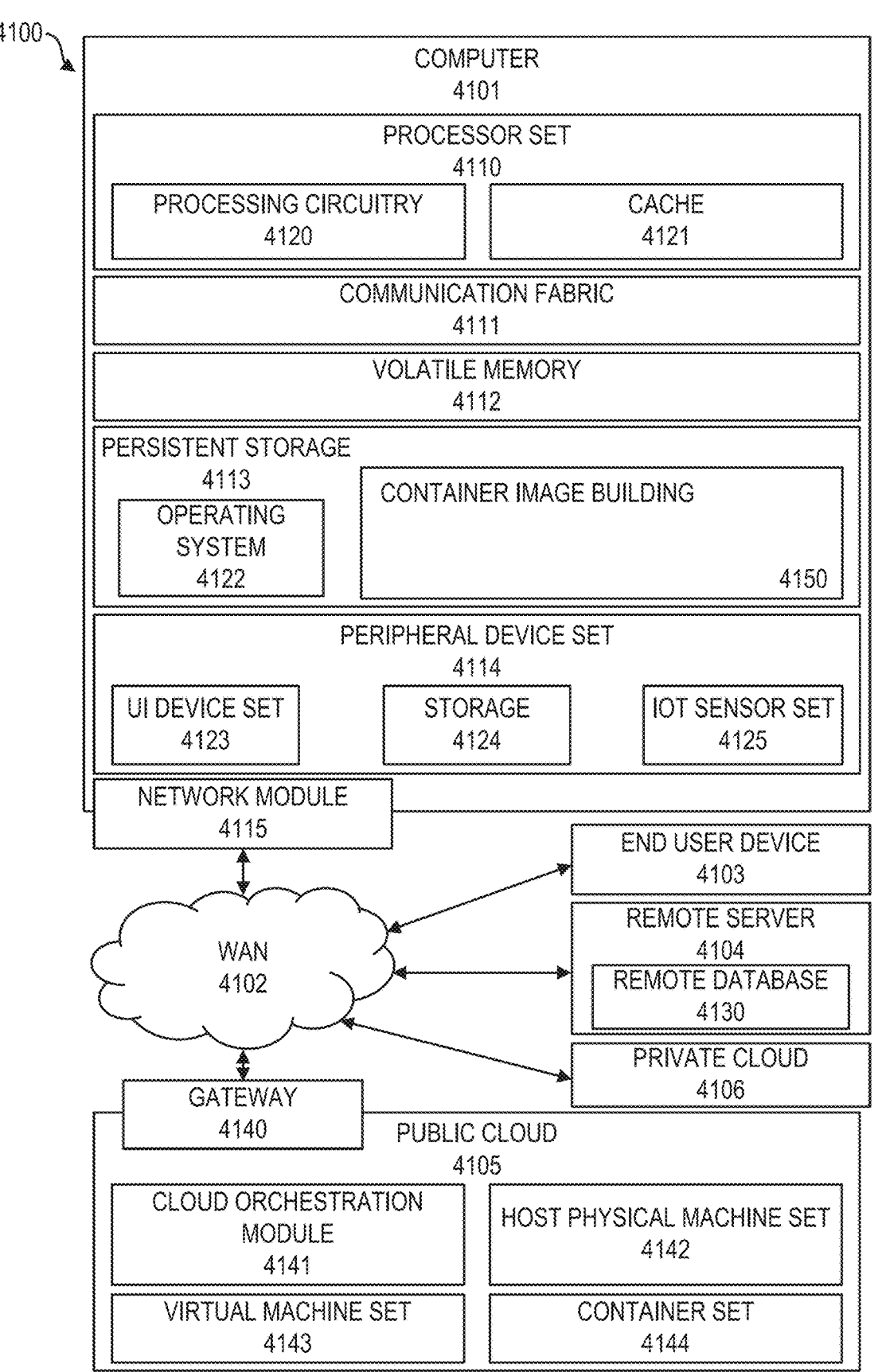
FIG. 7 depicts a computing environment according to one embodiment.

Service (PaaS), Database-as-a-Service (DBaaS), and combinations thereof based on types of subscription In reference to FIG. 7 there is set forth a description of a computing environment 4100 that can include one or more computer 4101. In one example, computing node 10 as set forth herein can be provided in accordance with computer 4101 as set forth in FIG. 7.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 7. In one aspect, a computing environment 4100 contains an example of an environment for the execution of at least some of the computer code involved in performing the inventive methods, such as code 4150 for performing container image building described with reference to FIGS. 1-6. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IOT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. IoT sensor set 4125, in one example, can include a Global Positioning Sensor (GPS) device, one or more of a camera, a gyroscope, a temperature sensor, a motion sensor, a humidity sensor, a pulse sensor, a blood pressure (bp) sensor or an audio input device.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 1. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid-state storage devices. Operating system 4122 may take several forms, such as various known proprietary operating systems or open source. Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector. A sensor of IoT sensor set 4125 can alternatively or in addition include, e.g., one or more of a camera, a gyroscope, a humidity sensor, a pulse sensor, a blood pressure (bp) sensor or an audio input device.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101) and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Examples herein provided to illustrate aspects of operation of processes are understood as prophetic examples.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements but is not limited to possessing only those one or more steps or elements. Likewise, a step of a method or an element of a device that "comprises," "has," "includes," or "contains" one or more features possesses those one or more features but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    receiving, via a user interface presented on a display device, a text string entered by a user into a free-form text entry area;

performing natural language processing to process the text string of the user, wherein the text string specifies characteristics of a container image to be built;
    extracting, via a trained predictive model, an intent label from the text string, the intent label identifying a container image functional class corresponding to the user's intent;
    processing, with use of natural language processing, instances of text-based data that describe respective ones of a plurality of container images stored within a container image repository;
    applying a trained model configured for semantic analysis of the instances of text-based data to generate predicted image labels;
    selecting, in dependence on the extracted intent label and the predicted image labels, a base image from the plurality of container images; and
    presenting prompting data to the user that prompts building of a new container image, wherein the prompting data references the base image.

2. The computer implemented method of claim 1, wherein the user interface facilitates entry of free-form text by the user.

3. The computer implemented method of claim 1, wherein the performing natural language processing to process the text string of the user includes applying model prompting data to the trained predictive model using the text string.

4. The computer implemented method of claim 1, wherein the processing, with use of natural language processing, text-based data that describes the plurality of container images, includes querying the trained model with text-based data describing a first container image, obtaining from the querying predicted first image labels describing the first container image, performing querying of the trained model with text-based data describing a second container image, and obtaining from the performing querying predicted second image labels describing the second container image.

5. The computer implemented method of claim 1, wherein the performing natural language processing to process the text string of the user includes applying model prompting data to the trained predictive model using the text string and obtaining predicted intent labels from the applying model prompting data.

6. The computer implemented method of claim 1, wherein the performing natural language processing to process the text string of the user includes applying model prompting data to the trained predictive model using the text string, and obtaining from the applying predicted intent labels, wherein the processing, with use of natural language processing, text-based data that describes the plurality of container images, includes querying the trained model with text-based data describing a first container image, obtaining from the querying predicted first image labels describing the first container image, performing querying of the trained model with text-based data describing a second container image, and obtaining from the performing querying predicted second image labels describing the second container image, and wherein the method includes comparing the predicted intent labels to the predicted first image labels and the predicted second image labels.

7. The computer implemented method of claim 1, wherein the performing natural language processing to process the text string of the user includes applying model prompting data to the trained predictive model using the text string, wherein the processing, with use of natural language processing, text-based data that describes the plurality of container images, includes querying the trained model with text-based data describing a first container image, performing querying of the trained model with text-based data describing a second container image, wherein the trained predictive model, and the trained model have been trained with supervised learning training data so that the trained predictive model and the trained model output predicted labels in common attribute categories.

8. The computer implemented method of claim 1, wherein the performing natural language processing to process the text string of the user includes applying model prompting data to the trained predictive model using the text string, and obtaining from the applying predicted intent labels having predicted intent attribute categories, wherein the processing, with use of natural language processing, text-based data that describes the plurality of container images, includes querying the trained model with text-based data describing a first container image, obtaining from the querying predicted first image labels having predicted image attribute categories describing the first container image, performing querying of the trained model with text-based data describing a second container image, and obtaining from the performing querying predicted second image labels having the predicted image attribute categories describing the second container image, and wherein the method includes comparing the predicted intent labels to the predicted first image labels and the predicted second image labels, and wherein the method includes coordinating training of the trained predictive model and the trained model so that the predicted image attribute categories map to the predicted intent attribute categories.

9. The computer implemented method of claim 1, wherein the selecting includes determining a semantic similarity of the text string to respective ones of the instances of text-based data that describe respective ones of the plurality of container images.

10. The computer implemented method of claim 1, wherein respective ones of the instances of text-based data that describe respective ones of the plurality of container images include (a) manifest data defined by a container image manifest, and (b) container image history data returned from running a container image history command.

11. The computer implemented method of claim 1, wherein the selecting includes determining a semantic similarity of the text string to respective ones of the instances of text-based data that describe respective ones of the plurality of container images, and wherein the determining the semantic similarity includes (a) extracting an intent label by application of the text string to the trained predictive model, (b) extracting respective image labels by querying the trained model using the respective instances of the text-based data describing respective ones of the plurality of container images, (c) converting the intent label and the respective image labels to vector representations using Word2Vec processing, and (d) finding a Euclidian distance between the vector representation of the intent label and respective vector representations of the respective image labels.

12. The computer implemented method of claim 1, wherein the method includes generating, in dependence on the processing, container image relationship graphs for respective ones of the plurality of container images.

13. The computer implemented method of claim 1, wherein the method includes generating, in dependence on the processing, container image relationship graphs for respective ones of the plurality of container images, and wherein the selecting is performed in dependence on edge weights of the container image relationship graphs for respective ones of the plurality of container images.

14. The computer implemented method of claim 1, wherein the method includes generating, in dependence on the processing, container image relationship graphs for respective ones of the plurality of container images, and wherein the selecting is performed in dependence on edge weights of the container image relationship graphs for respective ones of the plurality of container images, wherein the method includes, subsequent to the selecting, (a) updating an edge weight of a container image relationship graph of the base image in dependence on user specified review data of a runtime instance of the base image, (b) receiving, subsequent to the updating, the text string, and (c) performing selection of an alternate base image different from the base image in dependence on the edge weight of the container image relationship graph of the base image having been updated by the updating.

15. The computer implemented method of claim 1, wherein the method includes generating, in dependence on the processing, container image relationship graphs for respective ones of the plurality of container images, and wherein the selecting is performed in dependence on edge weights of the container image relationship graphs for respective ones of the plurality of container images, wherein the method includes, subsequent to the selecting, (a) updating an edge weight of a container image relationship graph of the base image in dependence on observability data collected for a runtime instance of the base image, (b) receiving, subsequent to the updating, the text string, and (c) performing selection of an alternate base image different from the base image in dependence on the edge weight of the container image relationship graph of the base image having been updated by the updating.

16. The computer implemented method of claim 1, wherein the method includes building the new container image, and deploying the new container image by running the new container image.

17. The computer implemented method of claim 1, wherein the method includes building the new container image in accordance with the prompting data and deploying the new container image by running the new container image.

18. The computer implemented method of claim 1, wherein the method includes building the new container image in accordance with user defined data input responsively to the prompting data and deploying the new container image by running the new container image.

19. A system comprising:

a memory;

at least one processor in communication with the memory; and program instructions executable by one or more processor via the memory to perform a method comprising:

receiving, via a user interface presented on a display device, a text string entered by a user into a free-form text entry area;

performing natural language processing to process the text string of the user, wherein the text string specifies characteristics of a container image to be built;

extracting, via a trained predictive model, an intent label from the text string, the intent label identifying a container image functional class corresponding to the user's intent;

processing, with use of natural language processing, instances of text-based data that describe respective ones of a plurality of container images stored within a container image repository;

applying a trained model configured for semantic analysis of the instances of text-based data to generate predicted image labels;

selecting, in dependence on the extracted intent label and the predicted image labels, a base image from the plurality of container images; and presenting prompting data to the user that prompts building of a new container image, wherein the prompting data references the base image.

20. A computer program product comprising:

a computer readable storage medium readable by one or more processing circuit and storing instructions for execution by one or more processor for performing a method comprising:

receiving, via a user interface presented on a display device, a text string entered by a user into a free-form text entry area;

performing natural language processing to process the text string of the user, wherein the text string specifies characteristics of a container image to be built;

extracting, via a trained predictive model, an intent label from the text string, the intent label identifying a container image functional class corresponding to the user's intent;

processing, with use of natural language processing, instances of text-based data that describe respective ones of a plurality of container images stored within a container image repository;

applying a trained model configured for semantic analysis of the instances of text-based data to generate predicted image labels;

selecting, in dependence on the extracted intent label and the predicted image labels, a base image from the plurality of container images; and presenting prompting data to the user that prompts building of a new container image, wherein the prompting data references the base image.

* * * * *